(12) United States Patent
Dowd et al.

(10) Patent No.: US 9,477,403 B2
(45) Date of Patent: Oct. 25, 2016

(54) DRAWING ON A TOUCHSCREEN

(71) Applicant: Adobe Systems Incorporated, San Jose, CA (US)

(72) Inventors: Geoffrey Dowd, San Francisco, CA (US); David Gideon Macy, Pacifica, CA (US); Arian Behzadi, San Francisco, CA (US); Gregory Cy Muscolino, Novato, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 340 days.

(21) Appl. No.: 14/090,311

(22) Filed: Nov. 26, 2013

(65) Prior Publication Data
US 2015/0145784 A1     May 28, 2015

(51) Int. Cl.
*G06F 3/0488*     (2013.01)

(52) U.S. Cl.
CPC ......... *G06F 3/04883* (2013.01); *G06F 3/0488* (2013.01)

(58) Field of Classification Search
CPC ............. G06F 3/033–3/0416; G06F 3/04883; G06F 3/0488
USPC .................................................. 345/173–184
See application file for complete search history.

(56) References Cited

U.S. PATENT DOCUMENTS

| | | | |
|---|---|---|---|
| 8,860,675 B2 * | 10/2014 | Wang | G06F 3/041 345/156 |
| 9,182,832 B2 * | 11/2015 | Natori | G06F 3/0308 |
| 9,261,996 B2 * | 2/2016 | Jung | G06F 3/041 |
| 2011/0164029 A1 * | 7/2011 | King | G06F 3/04883 345/419 |
| 2011/0175821 A1 * | 7/2011 | King | G06F 3/04883 345/173 |
| 2012/0194457 A1 * | 8/2012 | Cannon | G06F 3/011 345/173 |
| 2012/0313865 A1 * | 12/2012 | Pearce | G06F 3/0416 345/173 |
| 2012/0313870 A1 * | 12/2012 | Homma | G06T 11/20 345/173 |
| 2013/0016126 A1 * | 1/2013 | Wang | G06F 3/041 345/650 |
| 2013/0321350 A1 * | 12/2013 | Mesaros | G06F 3/0488 345/179 |
| 2014/0210748 A1 * | 7/2014 | Narita | G06F 3/0354 345/173 |

(Continued)

OTHER PUBLICATIONS

"Behance: Project Parallel by Adobe XD", [Online]. Retrieved from the Internet: <URL: http://www.behance.net/wip/229487/434519>, (Aug. 13, 2013), 3 pgs.

(Continued)

*Primary Examiner* — Dmitriy Bolotin
(74) *Attorney, Agent, or Firm* — Shook, Hardy & Bacon L.L.P.

(57) ABSTRACT

A touchscreen device may be configured to facilitate drawing lines, circles, and shapes through use of a guide device placed on the touchscreen. The touchscreen device may detect the position and orientation of the guide device, for example, by determining an axis of the guide device based on a set of locations at which the guide device triggered contact signals on the touchscreen. Based on the detected position and orientation of the guide device on its touchscreen, the touchscreen device may display one or more lines or shapes on the touchscreen. If a user traces a portion of such a displayed line or shape, the touchscreen device may display the traced portion. A button on the guide device may be configured to cause the touchscreen device to sequentially display available lines and shapes. The user may also configure the button to display one or more user-generated shapes.

20 Claims, 23 Drawing Sheets

(56) References Cited

U.S. PATENT DOCUMENTS

2014/0310631 A1* 10/2014 Harrison ............... G06F 3/0484
　　　　　　　　　　　　　　　　　　　　715/771
2015/0242000 A1* 8/2015 Dowd ................ G06F 3/03545
　　　　　　　　　　　　　　　　　　　　345/179

OTHER PUBLICATIONS

"Project Mighty & Napoleon: How it was done. on Behance", © 2006-2013 Adobe Systems Incorporated., [Online]. Retrieved from the Internet: <URL: http://www.behance.net/gallery/Project-Mighty-Napoleon-How-it-was-done/8440167>, (Accessed Oct. 16, 2013), 35 pgs.

* cited by examiner

DRAWING ON A TOUCHSCREEN

TECHNICAL FIELD

The subject matter disclosed herein generally relates to the processing of data. Specifically, the present disclosure addresses systems and methods to facilitate drawing on a touchscreen.

BACKGROUND

A touchscreen device may include a touchscreen (e.g., a touch-sensitive display screen) configured to present (e.g., display) visual information and receive touch input from a user (e.g., one or more touches on the touchscreen). The visual information (e.g., visual content) may be displayed using a graphical user interface (e.g., within one or more windows or full-screen within the edges of the touchscreen). The user input may be submitted by a user of the touchscreen device, for example, by contacting (e.g., touching) the touchscreen with a body part (e.g., a fingertip) or a stylus. Examples of a touchscreen device include a tablet computer (e.g., iPad® by Apple Inc.), a smart phone (iPhone® by Apple Inc.), a laptop computer (e.g., configured with a touchscreen), a kiosk computer (e.g., configured with a touchscreen), and any suitable combination thereof.

BRIEF DESCRIPTION OF THE DRAWINGS

Some embodiments are illustrated by way of example and not limitation in the figures of the accompanying drawings.

DETAILED DESCRIPTION

Figure 1:
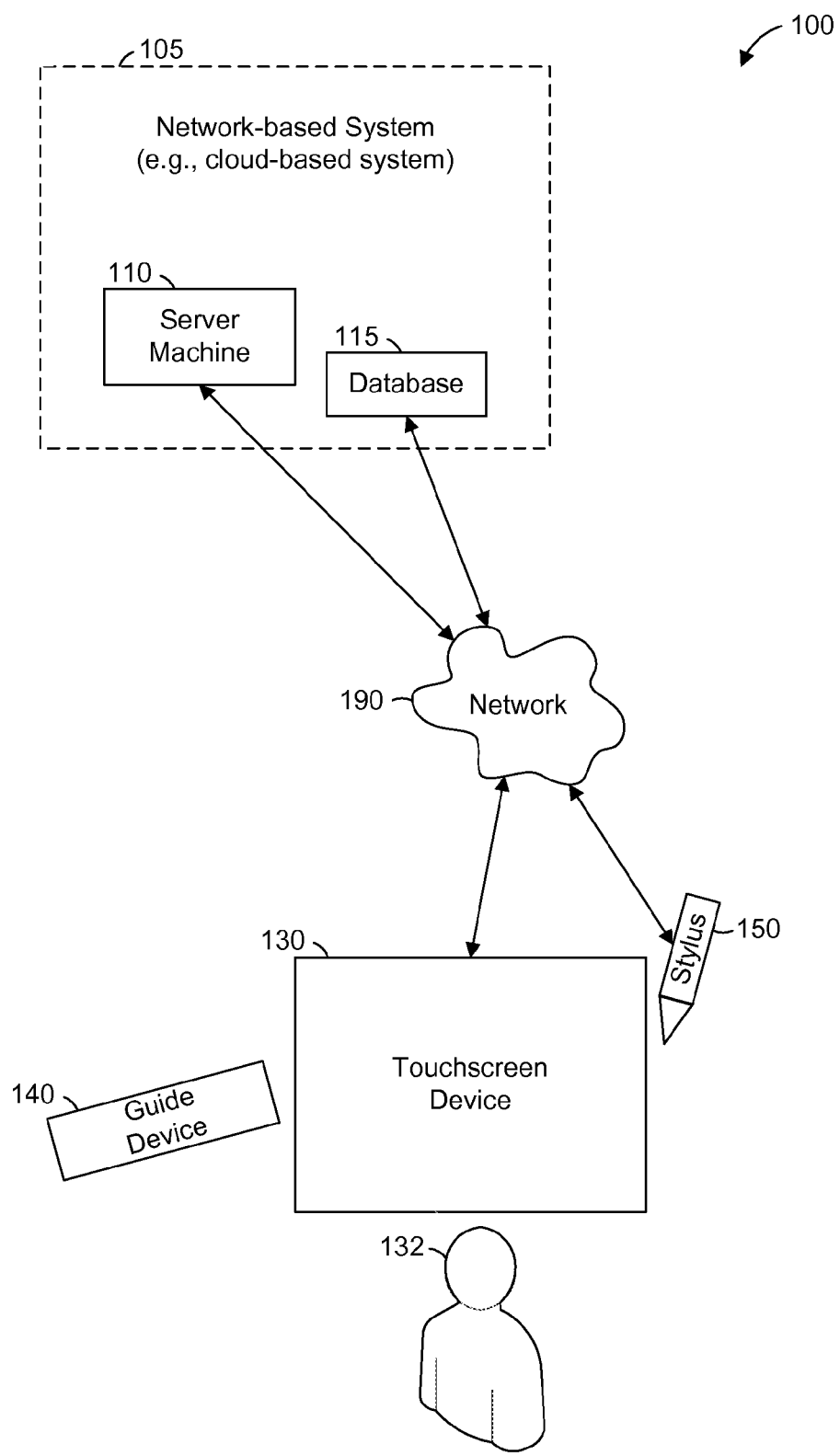
FIG. 1 is a network diagram illustrating a network environment suitable for drawing on a touchscreen, according to some example embodiments.

Example methods and systems are directed to drawing on a touchscreen. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A touchscreen device includes a touchscreen and may be configured (e.g., by suitable software, such as a drawing application) to facilitate drawing straight lines, perfect circles, and balanced shapes through use of a guide device. According to the example systems and methods discussed herein, the guide device may be placed (e.g., by a user) on the touchscreen, and the touchscreen device may detect the position and orientation of the guide device on the touchscreen. The position and orientation of the guide device may be determined by determining an axis (e.g., a longitudinal axis, which may represent the longest physical dimension of the guide device) of the guide device based on a set of locations at which the guide device triggered contact signals on the touchscreen. Based on the detected position and orientation of the guide device on its touchscreen, the touchscreen device may display one or more lines (e.g., hint lines or, in the nomenclature of technical drawing, construction lines) or shapes (e.g., hint shapes) on the touchscreen.

If a user traces a portion of such a displayed line or shape (e.g., with a fingertip or a stylus), the touchscreen device may display the traced portion (e.g., thicker or darker than the displayed line or shape, or otherwise emphasized or indicated as being drawn). The tracing of the portion may be precise or approximate (e.g., within a predetermined maximum distance from the displayed line or shape). In some example embodiments, the guide device includes one or more buttons, and a button on the guide device may be configured to cause the touchscreen device to replace a displayed line with a shape, replace a displayed shape with another shape, or replace a displayed shape with a line. In certain example embodiments, the user may configure the button to display one or more user-generated shapes (e.g., previously generated by the user, stored by a network-based system, and downloaded to the touchscreen device). In various example embodiments, an activation of the button (e.g., beyond a predetermined threshold duration) causes the touchscreen device to display one or more icons that indicate available snap points on drawn objects displayed by the touchscreen.

As used herein, a "guide device" may be any device (e.g., a companion device for the touchscreen device) configured to trigger a set of one or more contact signals on a touchscreen of a touchscreen device. For example, the guide device may be or include a straightedge device (e.g., a device that resembles a straightedge or ruler). In some example embodiments, the guide device has at least one straight side that is parallel with an axis (e.g., the longitudinal axis) of the guide device. For clarity, a guide device in the example form of a rectangular straightedge device is discussed below and illustrated in the accompanying drawings. However, the guide device may take any of various other forms, including circular, oval, triangular, star-shaped, irregularly shaped, or any suitable combination thereof.

FIG. 1 is a network diagram illustrating a network environment 100 suitable for drawing on a touchscreen, according to some example embodiments. The network environment 100 includes a server machine 110, a database 115, a touchscreen device 130, and the stylus 150, all communicatively coupled to each other via a network 190. The server machine 110, the database 115, the touchscreen device 130, and the stylus 150 may each be implemented in a suitably sized computer system, in whole or in part, as described below with respect to FIG. 23. Also shown is a guide device 140, which may be configured to interoperate with the touchscreen device 130. For example, the guide device 140 may be built or adapted to trigger one or more contact signals on a touchscreen of the touchscreen device 130, when the guide device 140 is placed fully or partially on the touchscreen of the touchscreen device 130.

Also shown in FIG. 1 is a user 132 of the touchscreen device 130. The user 132 may be a human user (e.g., a human being), a machine user (e.g., a computer-controlled robot configured by a software program to interact with the touchscreen device 130, the guide device 140, and the stylus 150, for example, to mimic a human user), or any suitable combination thereof (e.g., a human assisted by a machine or a machine supervised by a human). The user 132 is not part of the network environment 100, but is associated with the touchscreen device 130 and may be a user of the touchscreen device 130, as well as the user of the guide device 140 and the stylus 150. For example, the touchscreen device 130 may be or include a desktop computer, a vehicle computer, a tablet computer, a navigational device, a portable media device, or a smart phone belonging to the user 132.

The server machine 110, with or without the database 115, may form all or part of a network-based system 105 (e.g., a cloud-based creativity support system). The server machine 110 may store files and settings that correspond to the user 132 (e.g., files that belong to the user 132, files that the user 132 is authorized to access, or a profile of preferences set by the user 132). For example, the server machine 110 may store one or more files and settings (e.g., a profile of preferences) of the user 132 in the database 115 for subsequent access and retrieval (e.g., downloading to the touchscreen device 130). An example of such a file is a previously saved drawing generated by the user, or a portion thereof, such as a user-generated shape).

The touchscreen device 130 has a touchscreen and may be used by the user 132 to draw one or more objects (e.g., lines or shapes, in various colors) on the touchscreen. The touchscreen device 130 may be configured to interoperate with the stylus 150, which may be configured to access the server machine 110 and retrieve one or more files or settings of the user 132. For example, the stylus 150 may be configured (e.g., with suitable hardware and software) to wirelessly communicate with the touchscreen device 130 (e.g., via the network 190, or via another network, such as a Bluetooth network). This may have the effect of allowing the user 132 to access his files, settings, or both, on any touchscreen device (e.g., touchscreen device 130) by bringing the stylus 150 to any touchscreen device and using the stylus 150 with that touchscreen device.

Any of the machines, databases, or devices shown in FIG. 1 may be implemented in a suitably sized general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 23. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the touchscreen device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible medium that is capable of storing, encoding, or carrying instructions for execution by a machine, and includes digital or analog communication signals or other intangible media to facilitate communication of such software.

Figure 2:
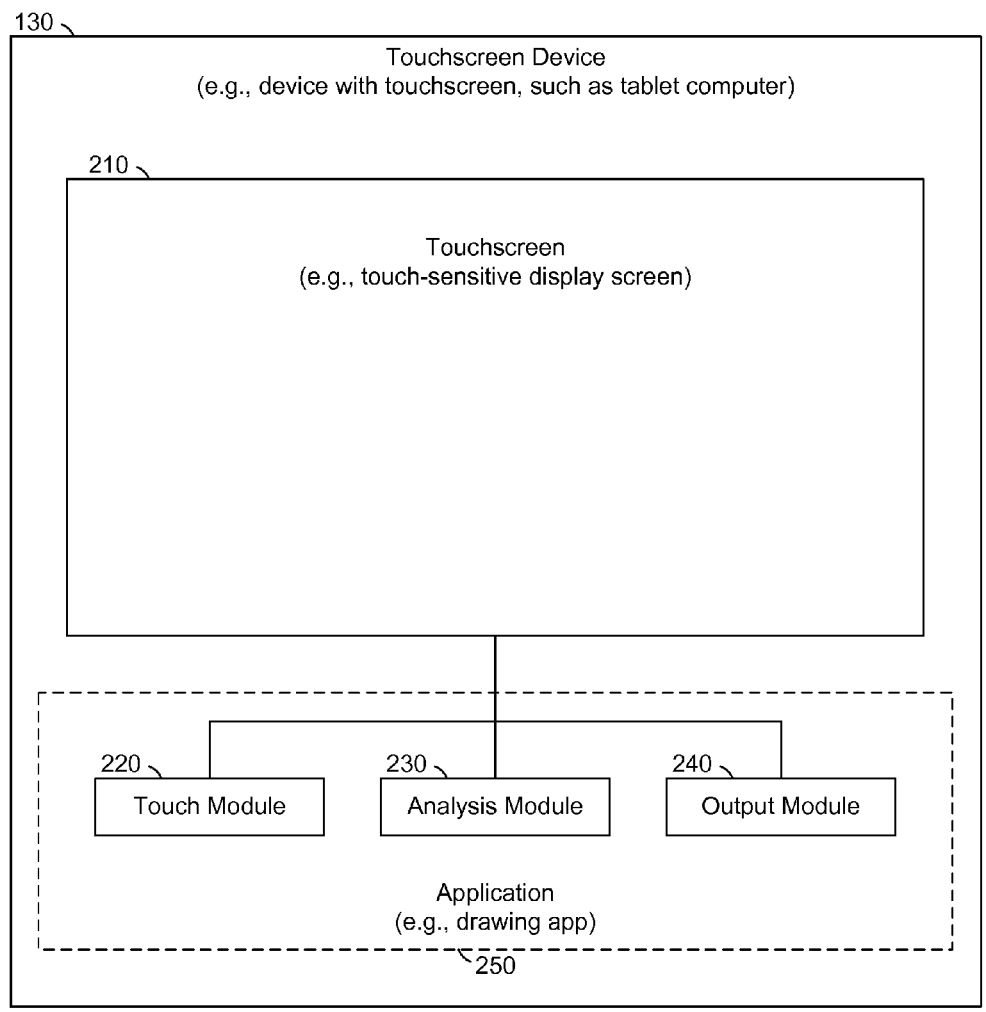
FIG. 2 is a block diagram illustrating components of a touchscreen device suitable for drawing on a touchscreen, according to some example embodiments.

FIG. 2 is a block diagram illustrating components of the touchscreen device 130, according to some example embodiments. The touchscreen device 130 includes a touchscreen 210, which may be or include a touch-sensitive display screen and configured to display visual information (e.g., one or more drawn objects, images, video, elements of a graphical user interface, or other visual content) and receive touch input generated by the user 132 (e.g., contact signals resulting from touches of the stylus 150 or a fingertip of the user). The touchscreen device 130 is shown as including the touchscreen 210, a touch module 220, an analysis module 230, and an output module 240, all configured to communicate with each other (e.g., via a bus, shared memory, or a switch). As shown in FIG. 2, the touch module 220, the analysis module 230, and the output module 240 may form all or part of an application 250 (e.g., a drawing application or a mobile app for making drawings) that is executable by the touchscreen device 130.

The touch module 220 is configured to detect touches on the touchscreen 210 and distinguish touches by the guide device 140 from other touches on the touchscreen 210 (e.g., by the stylus 150 or by the user 132). As discussed in greater detail below, the touch module 220 may detect a set of one or more locations at which placement of the guide device 140 on the touchscreen 210 triggers a corresponding set of one or more contact points on the touchscreen 210.

The analysis module 230 is configured to determine the position of the guide device 140 on the touchscreen 210 and the orientation (e.g., angular orientation) of the guide device 140 on the touchscreen 210. As discussed in greater detail below, the analysis module 230 may determine the position and the orientation of the guide device 140 by determining an access (e.g., the longitudinal axis) of the guide device 140 (e.g., based on the set of locations detected by the touch module 220).

The output module 240 is configured to display one or more lines, one or more shapes, or both, on the touchscreen 210. As discussed in greater detail below, the output module 240 may cause the touchscreen 210 to display a line, shape, or both, based on the determined position and orientation of the guide device 140 (e.g., as determined by the analysis module 230).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
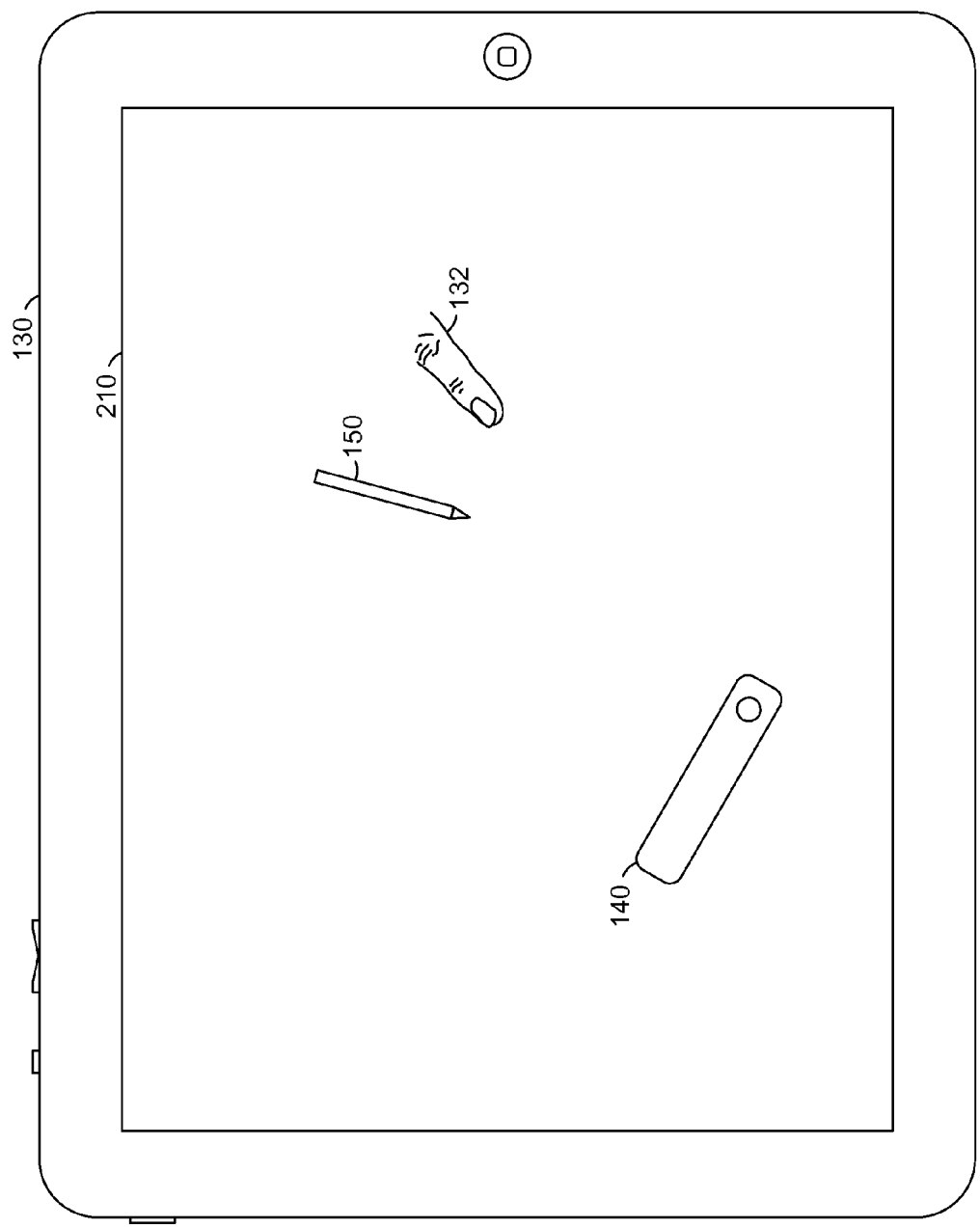
FIG. 3 is a top plan view of the touchscreen device, illustrating a guide device, a stylus, and a body part of a user in contact with the touchscreen device, according to some example embodiments.

FIG. 3 is a top plan view of the touchscreen device 130, illustrating the guide device 140, the stylus 150, and a body part (e.g., body member, such as a fingertip) of the user 132 in contact with the touchscreen device 130, according to some example embodiments. As shown, the touchscreen device 130 encompasses the touchscreen 210, on which may be placed the guide device 140, the stylus 150, and the body part of the user 132, or any suitable combination thereof. Accordingly, one or more of the guide device 140, the stylus 150, and the body part of the user 132 may be placed in contact with the touchscreen 210 and accordingly trigger contact signals on the touchscreen 210. Each of the triggered contact signals may have a corresponding location on the touchscreen 210. Moreover, moving (e.g., dragging) the placed guide device 140, stylus 150, or body part of the user 132 across the touchscreen 210 may trigger one or more different contact signals that correspond to different locations on the touchscreen 210.

Figure 4:
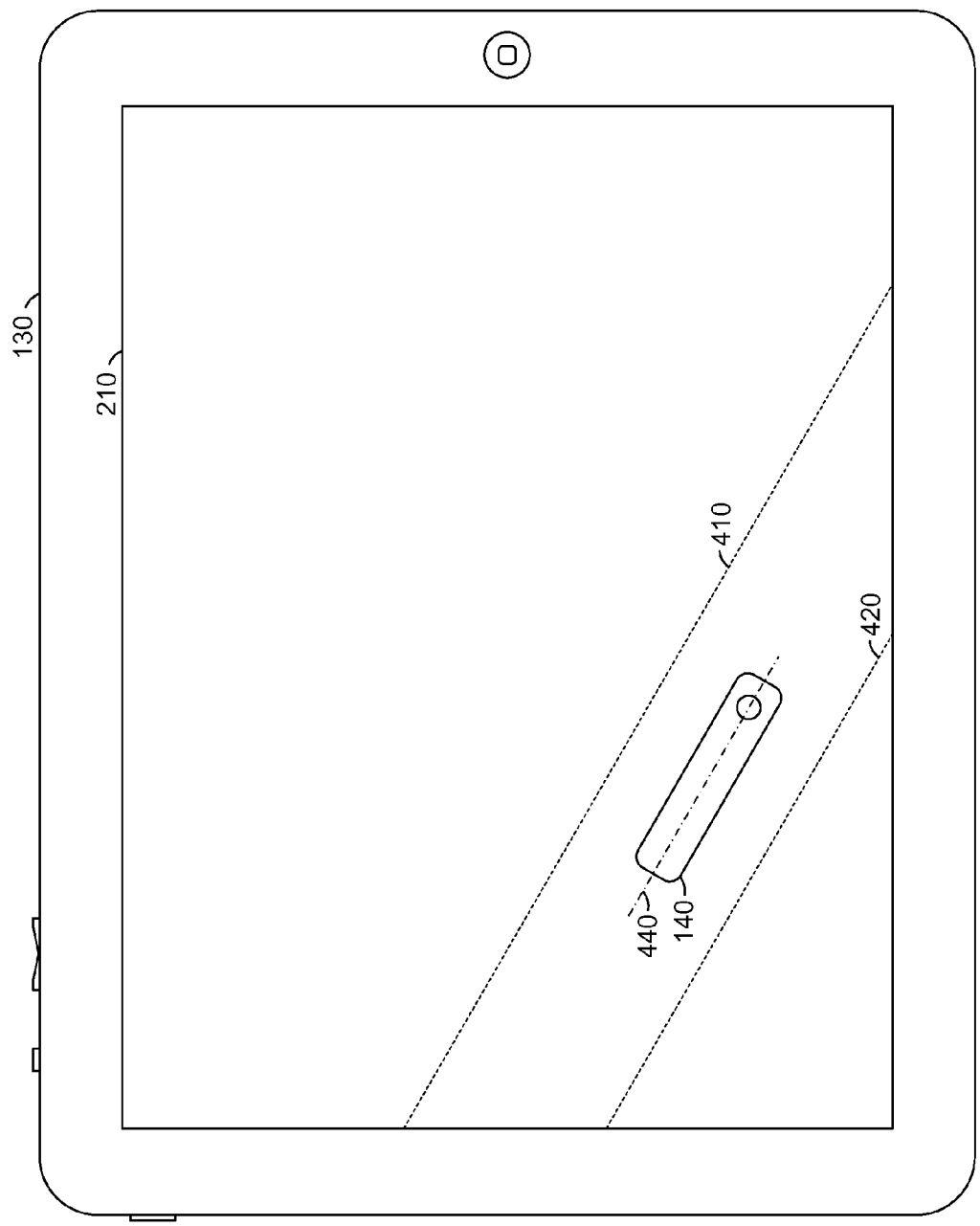
FIG. 4 is a top plan view of the touchscreen device, illustrating the guide device, an axis of the guide device, and hint lines displayed by the touchscreen device, according to some example embodiments.

FIG. 4 is a top plan view of the touchscreen device 130, illustrating the guide device 140, an axis 440 of the guide device 140, and hint lines 410 and 420 being displayed on the touchscreen 210 of the touchscreen device 130, according some example embodiments. The guide device 140 is shown as having been placed on the touchscreen 210. The axis 440 may be a longitudinal axis of the guide device 140 (e.g., an axis along or parallel to the longest dimension of the guide device 140), an axis of symmetry of the guide device 140, or both. As discussed in greater detail below, the touch module 220 may detect a set of locations that correspond to the guide device 140 in contact with the touchscreen 210, and the axis 440 may be determined by the analysis module 230 based on this set of locations. The output module 240 may display one or both of the hint lines 410 and 420 on the touchscreen 210 (e.g., by causing the touchscreen 210 to display one or both of the hint lines 410 and 420).

As shown in FIG. 4, one or both of the hint lines 410 and 420 may be displayed parallel to the axis 440 of the guide device 140. Moreover, one or both of the hint lines 410 and 420 may be displayed at a distance apart (e.g., separated by the distance) from the guide device 140. FIG. 4 illustrates the hint lines 410 and 420 extending to the edges of the touchscreen 210, though in various example embodiments one or both of the hint lines 410 and 420 do not extend to the edges of the touchscreen 210.

Figure 5:
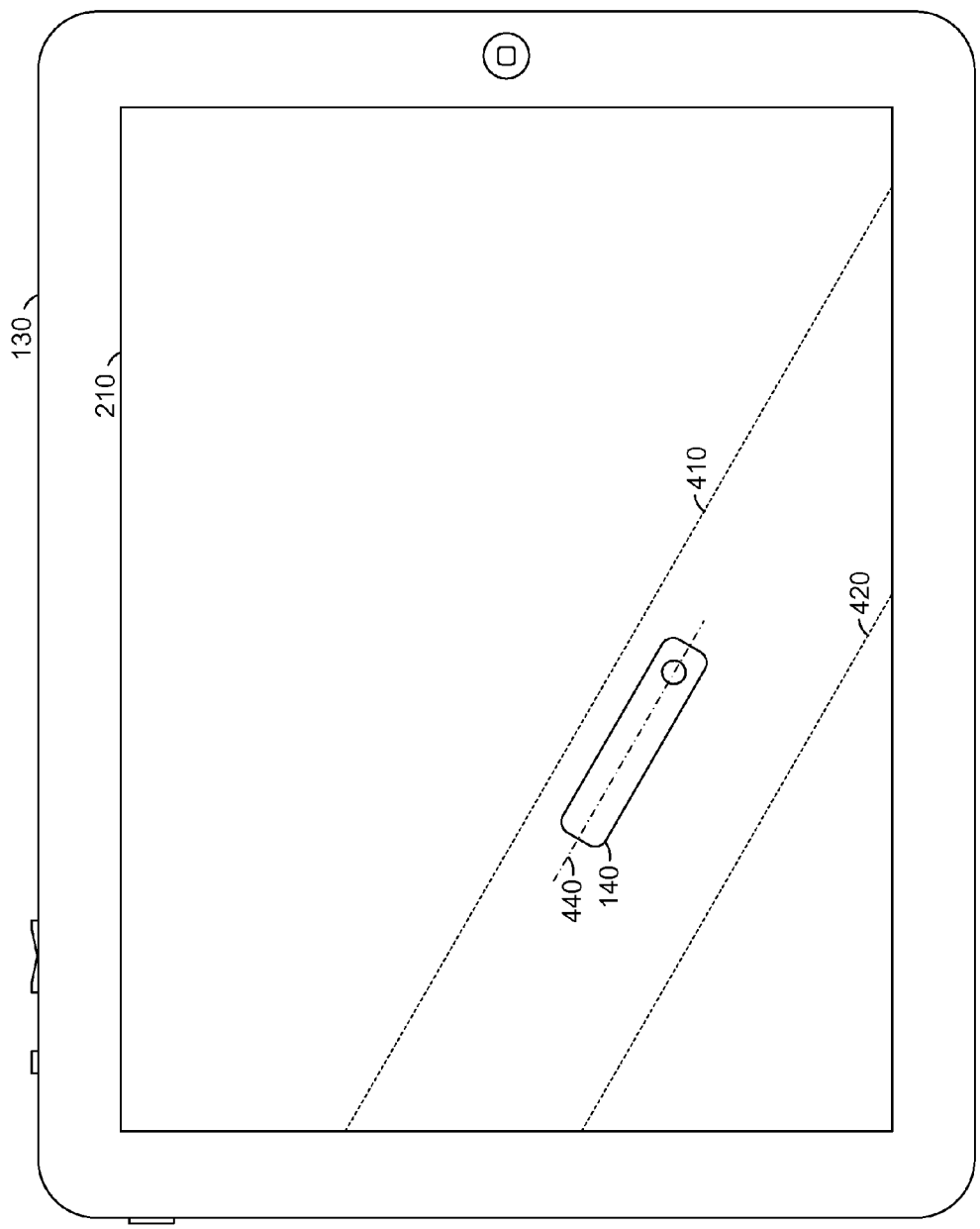
FIG. 5 is a top plan view of the touchscreen device, illustrating the guide device, the axis of the guide device, and the hint lines while the guide device is moving across the touchscreen, according to some example embodiments.

FIG. 5 is a top plan view of the touchscreen device 130, illustrating the guide device 140, the axis 440 of the guide device 140, and the hint lines 410 and 420 while the guide device 140 is moving (e.g., being slid by the user 132) across the touchscreen 210, according to some example embodiments. As shown, the hint lines 410 and 420 are parallel to the axis 440 of the guide device 140, and the guide device 140 is being moved in a direction perpendicular to the axis 440 or in a direction that has a component perpendicular to the axis 440. As described in greater detail below, the distance between the guide device 140 and one or both of the hint lines 410 and 420 may be determined (e.g., by the output module 240) based on the perpendicular speed of the guide device 140 relative to the axis 440 (e.g., based on the perpendicular speed of the axis 440 relative to itself).

Figure 6:
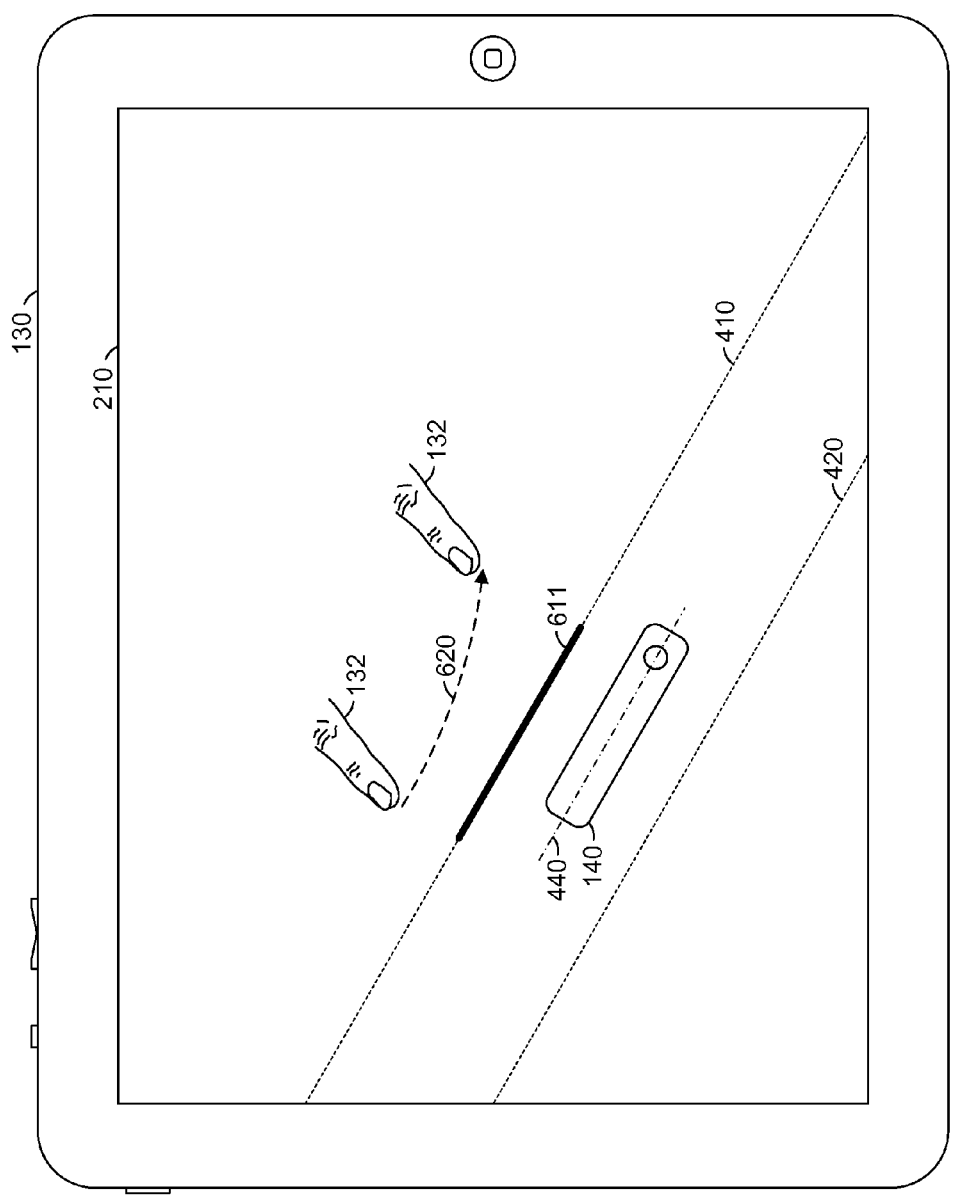
FIG. 6 is a top plan view of the touchscreen device, illustrating a line segment being drawn by a drag input on the touchscreen, according to some example embodiments.

FIG. 6 is a top plan view of the touchscreen device 130, illustrating a line segment 611 being drawn by a drag input 620 on the touchscreen 210, according to some example embodiments. As shown, the drag input 620 may result from the body part of the user 132 touching the touchscreen 210 and dragging (e.g., sliding) from one location to another on the touchscreen 210. Since the drag input 620 is detected (e.g., by the touch module 220) while the hint lines 410 and 420 are displayed, the hint line 410 (e.g., as the nearest hint line to the drag input 620) is used (e.g., by the output module 240) as a guide for drawing the line segment 611 (e.g., thicker than the hint line 410, or otherwise indicated as being drawn).

As shown in FIG. 6, the endpoints (e.g., a start point and an end point) of the line segment 611 may be determined (e.g., by the output module 240) based on the drag input 620 (e.g., based on a start location and an end location of the drag input 620). For example, a start point of the line segment 611 may be determined by orthogonally projecting an initial location of the drag input 620 onto the hint line 410, such that an invisible line perpendicular to the hint line 410 intersects the initial location of the drag input 620. As another example, an end point of the line segment 611 may be determined by orthogonally projecting a final location of the drag input 620 onto the hint line 410, such that an invisible line perpendicular to the hint line 410 intersects the final location of the drag input 620.

Figure 7:
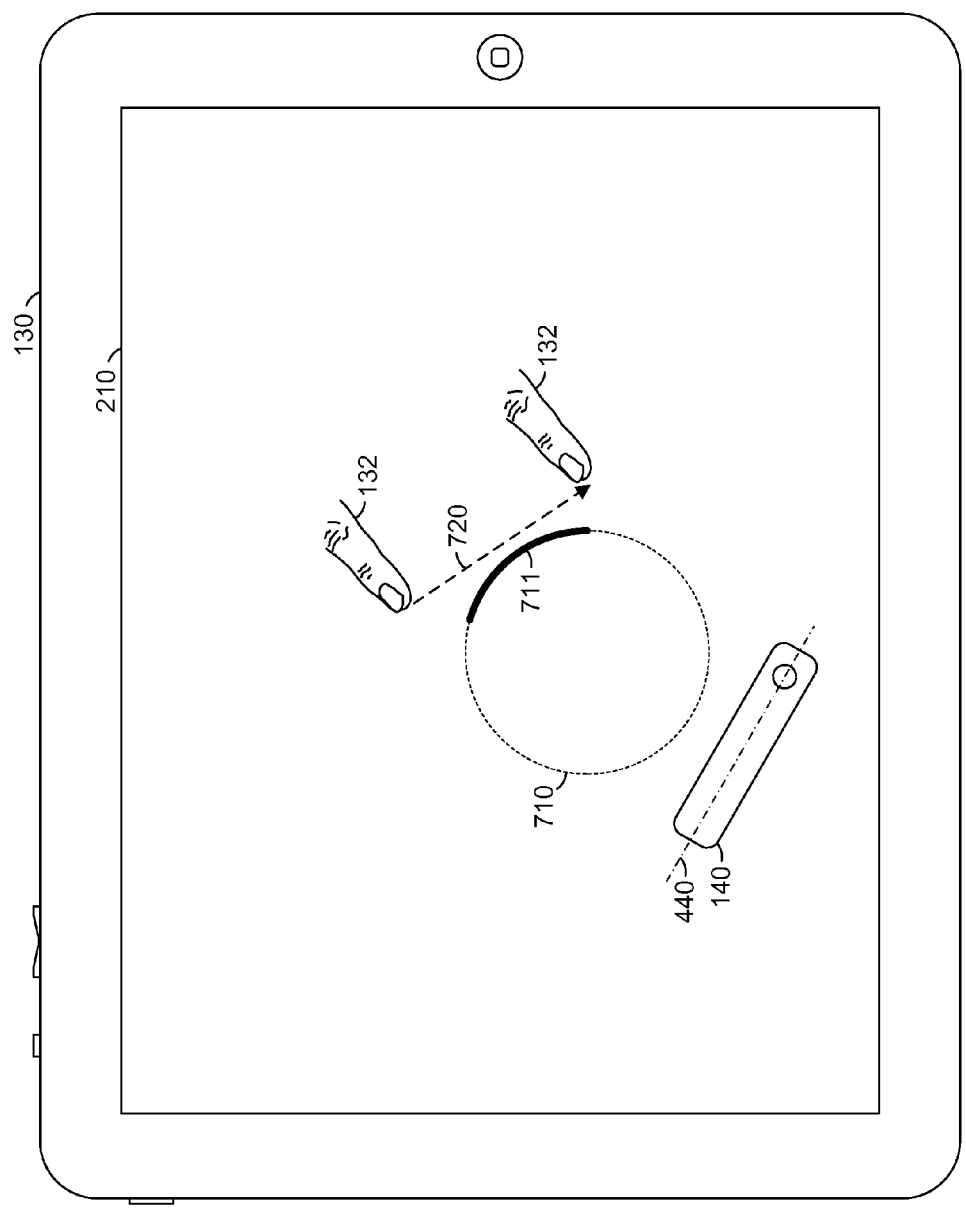
FIGS. 7 and 8 are top plan views of the touchscreen device, illustrating portions of shapes being drawn by drag inputs on the touchscreen, according to some example embodiments.
Figure 8:
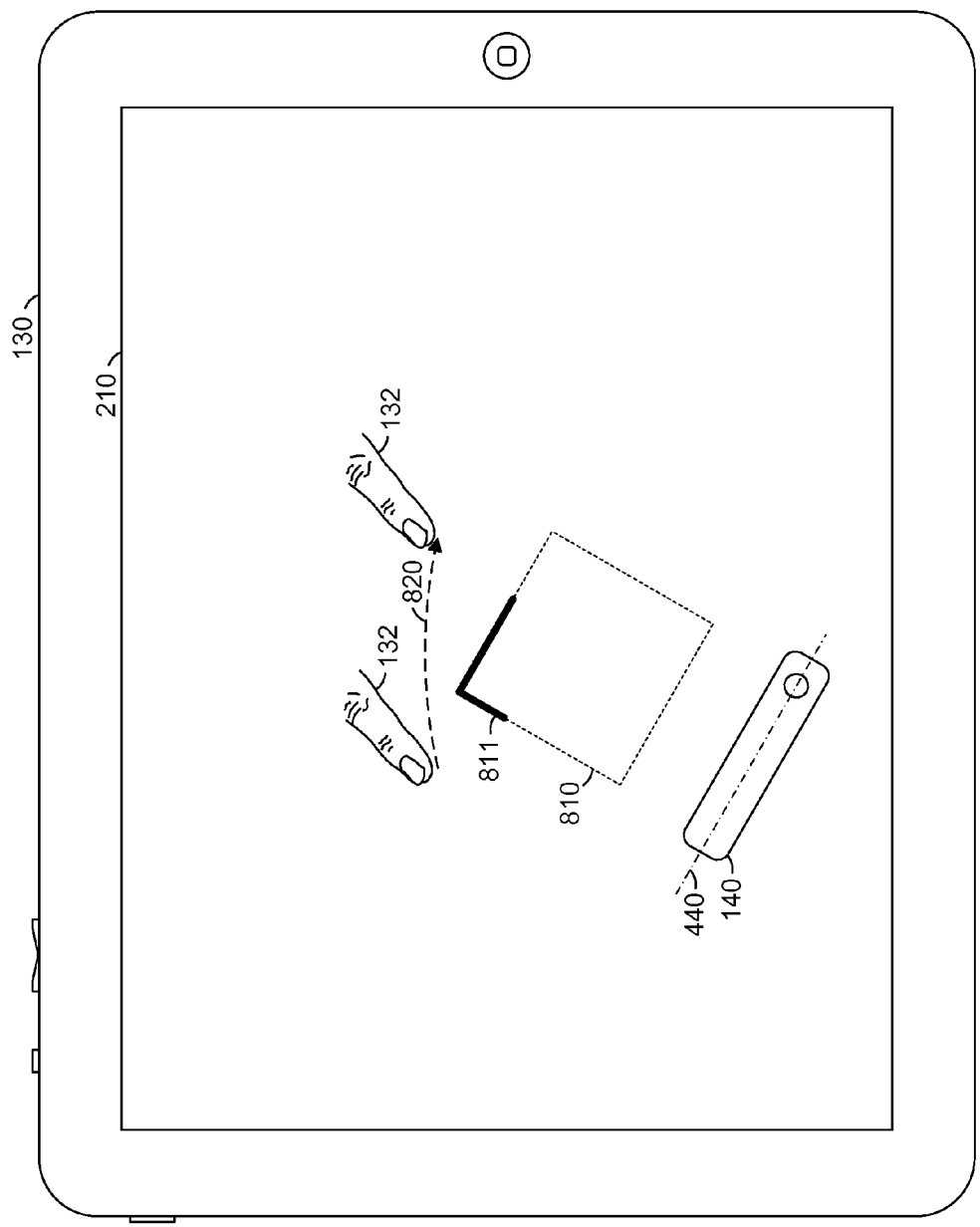

FIGS. 7 and 8 are top plan views of the touchscreen device 130, illustrating portions 711 and 811 of shapes 710 and 810 being drawn by drag inputs 720 and 820 on the touchscreen 210, according to some example embodiments. According to various example embodiments, the guide device 140, the application 250, or both, may offer the user 132 a variety of lines, shapes, or both, as drawing guides. For example, the user 132 may select from a set (e.g., "palette") of lines, shapes, or both, by activating a control (e.g., a button) on the guide device 140, by configuring the application 250 (e.g., by operating a palette control setting or by saving a user preference), by activating a control on the stylus 150, or any suitable combination thereof. In some example embodiments, the set of lines, shapes, or both, may be presented one at a time (e.g., cyclically scrolled) with each activation of a suitable control. Moreover, the set of lines, shapes, or both, may include one or more user-generated lines or shapes.

As shown in FIG. 7, the drag input 720 may result from the body part of the user 132 touching the touchscreen 210 and performing a drag motion from one location to another location on the touchscreen 210. Since the drag input 720 is detected (e.g., by the touch module 220) while the shape 710 (e.g., a circle) is displayed at a distance away from the guide device 140, the shape 710 is used (e.g., by the output module 240) as a guide for drawing the portion 711 of the shape 710 (e.g., thicker than the shape 710, or otherwise indicated as being drawn). Moreover, the endpoints of the portion 711 may be determined (e.g., by the output module 240) based on the drag input 720 (e.g., based on a start location and an end location of the drag input 720). For example, a start point of the portion 711 may be determined by radially projecting an initial location of the drag input 720 toward the center of the shape 710 (e.g., the center of the circle), such that an invisible line from the center to the initial location intersects the shape 710 at the start point of the portion 711. As another example, an end point of the portion 711 may be determined by radially projecting a final location of the drag input 720 toward the center of the shape 710, such that an invisible line from the center to the final location intersects the shape 710 at the end point of the portion 711.

As shown in FIG. 8, the drag input 820 may result from the body part of the user 132 touching the touchscreen 210 and performing a drag motion from one location to another location on the touchscreen 210. Since the drag input 820 is detected (e.g., by the touch module 220) while the shape 810 (e.g., a square) is displayed at a distance away from the guide device 140, the shape 810 is used (e.g., by the output module 240) as a guide for drawing the portion 811 of the shape 810 (e.g., thicker than the shape 810, or otherwise indicated as being drawn). Moreover, the endpoints of the portion 811 may be determined (e.g., by the output module 240) based on the drag input 820 (e.g., based on a start location and an end location of the drag input 820). For example, a start point of the portion 811 may be determined by radially projecting an initial location of the drag input 820 toward the center of the shape 810 (e.g., the center of the square), such that an invisible line from the center to the initial location intersects the shape 810 at the start point of the portion 811. As another example, an end point of the portion 811 may be determined by radially projecting a final location of the drag input 820 toward the center of the shape 810, such that an invisible line from the center to the final location intersects the shape 810 at the end point of the portion 811.

Figure 9:
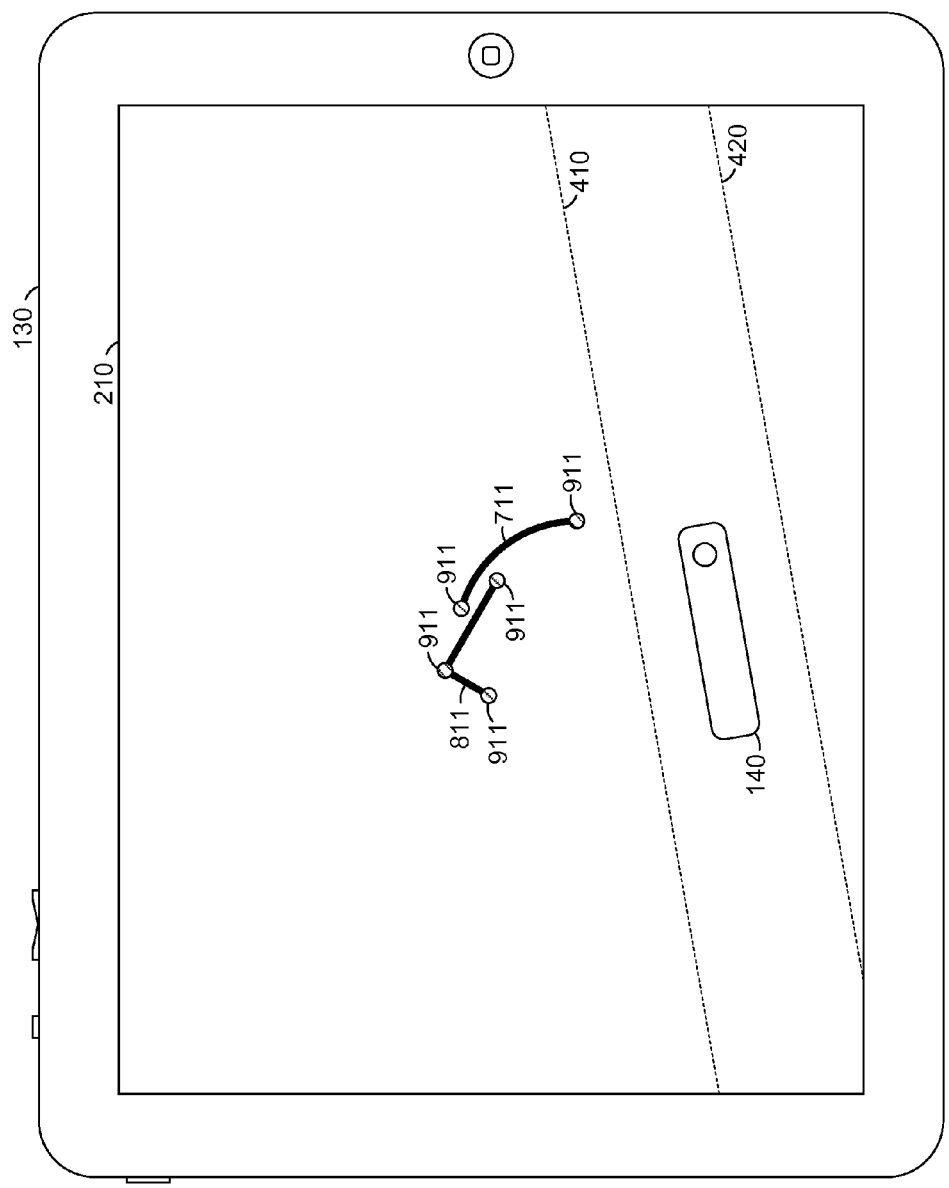
FIG. 9 is a top plan view of the touchscreen device, illustrating icons that indicate available snap points on drawn objects, according to some example embodiments.

FIG. 9 is a top plan view of the touchscreen device 130, illustrating icons 911 that indicate available snap points on drawn objects (e.g., portions 711 and 811), according to some example embodiments. As used herein, a "snap point" refers to a point to which a displayed hint line (e.g., hint line 410) or a displayed shape may be automatically moved, such that the moved hint line or shape intersects that point. This may facilitate precise drawing of connected objects on the touchscreen 210, with minimal likelihood of small gaps or overruns being inadvertently introduced.

According to various example embodiments, if the guide device 140, a hint line (e.g., hint line 410), or both, are moved within a predetermined threshold distance (e.g., a first predetermined threshold distance, such as 200 pixels) of one or more snap points, those snap points that are within the predetermined threshold distance may be indicated (e.g., by the output module 240) with the icons 911. In some example embodiments, one or more available snap points are indicated with the icons 911 in response to activation of a button on the guide device 140 (e.g., a prolonged press of the button beyond a predetermined threshold duration, such as 800 milliseconds). The icons 911 may be referred to as "bumpers," due to a visual resemblance to cushions or pads. As shown in FIG. 9, five instances of the icons 911 are displayed on the touchscreen 210 to indicate five available snap points. Three snap points may be indicated on the portion 811 (e.g., a portion of a square), for example, at both endpoints of the portion 811 and at a corner of the portion 811. Two snap points may be indicated on the portion 711 (e.g., a portion of a circle), for example, at both endpoints of the portion 711.

Figure 10:
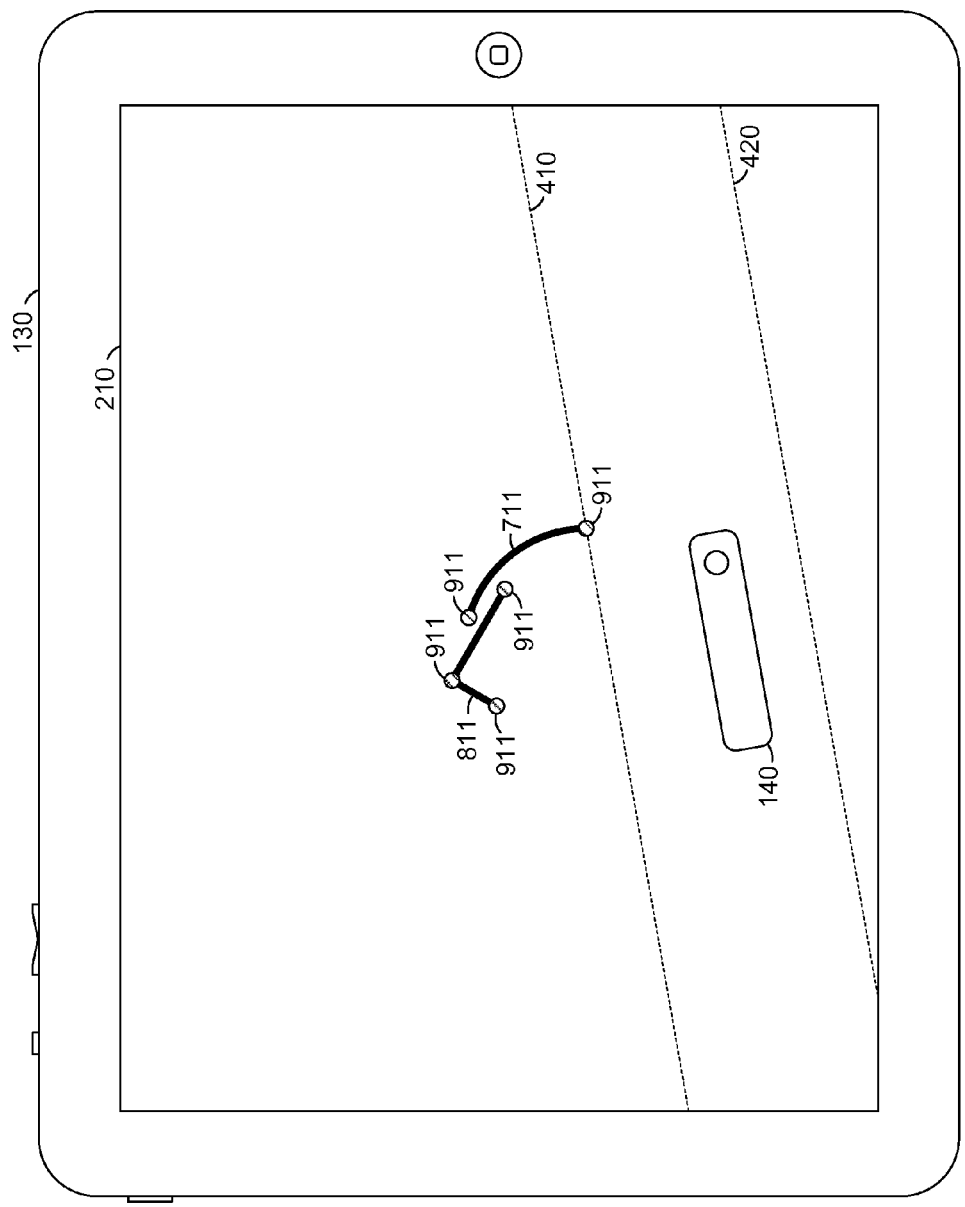
FIG. 10 is a top plan view of the touchscreen device, illustrating a hint line snapped to an available snap point on a drawn object, according to some example embodiments.

FIG. 10 is a top plan view of the touchscreen device 130, illustrating the hint line 410 snapped to an available snap point on a drawn object, according to some example embodiments. As shown, the hint line 410 has been moved (e.g., by the output module 240) to intersect an endpoint of the portion 711 (e.g., a portion of the circle). This endpoint is marked with the icon 911 (e.g., a bumper). In some example embodiments, after one or more snap points is indicated (e.g., by icons 911), moving the guide device 140, a hint line (e.g., hint line 410), or both, within another predetermined threshold distance (e.g., a second predetermined threshold distance, such as 50 pixels) of the nearest snap point results in the hint line (e.g., hint line 410) being moved to intersect the nearest snap point. FIG. 10 illustrates a situation where this has occurred.

Figure 11:
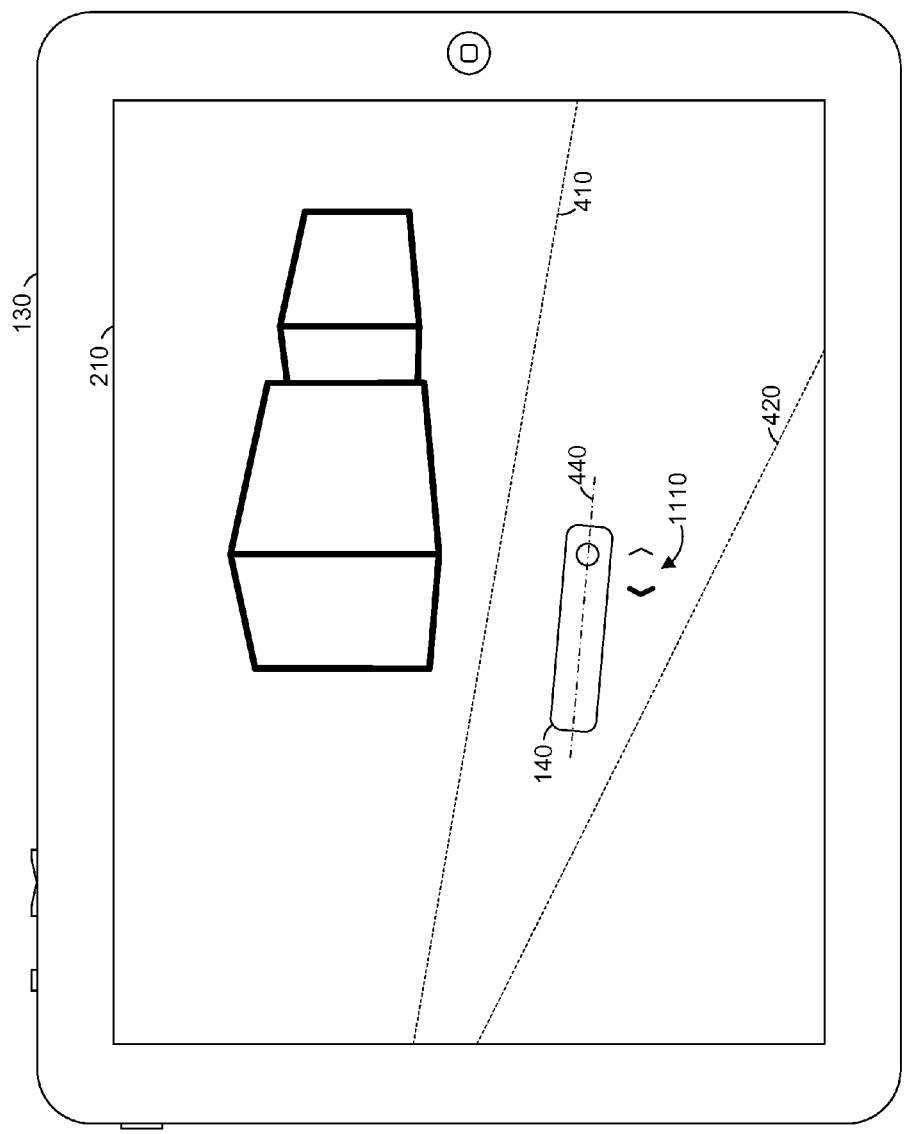
FIG. 11 is a top plan view of the touchscreen device, illustrating the hint lines pointing toward a left vanishing point within a perspective drawing, according to some example embodiments.

FIG. 11 is a top plan view of the touchscreen device 130, illustrating the hint lines 410 and 420 pointing toward a left vanishing point (e.g., off screen as shown, or on the touchscreen 210) within a perspective drawing (e.g., with the application 250 operating in "perspective mode"), according some example embodiments. According to various example embodiments, the guide device 140, the application 250, or both, may allow the user 132 to switch the application 250 between a normal mode and a perspective mode, for example, by activating a control (e.g., a button) on the guide device 140, by configuring the application 250 (e.g., by operating a palette control setting or by saving a user preference), by activating a control on the stylus 150, or any suitable combination thereof.

Although the perspective drawing shown in FIG. 11 utilizes two-point perspective, alternative example embodiments may utilize single-point perspective. The display of the hint lines 410 and 420 as pointing toward the vanishing point (e.g., a left vanishing point in a two-point perspective drawing) may be based on the orientation of the guide device 140 (e.g., as indicated by its axis 440). For example, the output module 240 may display one or more of the hint lines 410 and 420 as pointing toward a vanishing point in response to the axis 440 of the guide device 140 being aligned within a predetermined threshold angle (e.g., 15 degrees) of an invisible line that intersects the vanishing point.

In some example embodiments that support two-point perspective views, the vanishing point is selectable by the user 132 through operation of a toggle icon 1110. As shown in FIG. 11, the toggle icon 1110 indicates that the left vanishing point has been chosen (e.g., as indicated by a thick left arrow) and that a right vanishing point has not been chosen (e.g., as indicated by a thin right arrow), but is available for selection. The toggle icon 1110 may be displayed by the output module 240 on the touchscreen, and the toggle icon 1110 may function as a control (e.g., a selector) that is operable by the user 132 (e.g., by touching one of the arrows) to select one vanishing point over the other vanishing point.

Figure 12:
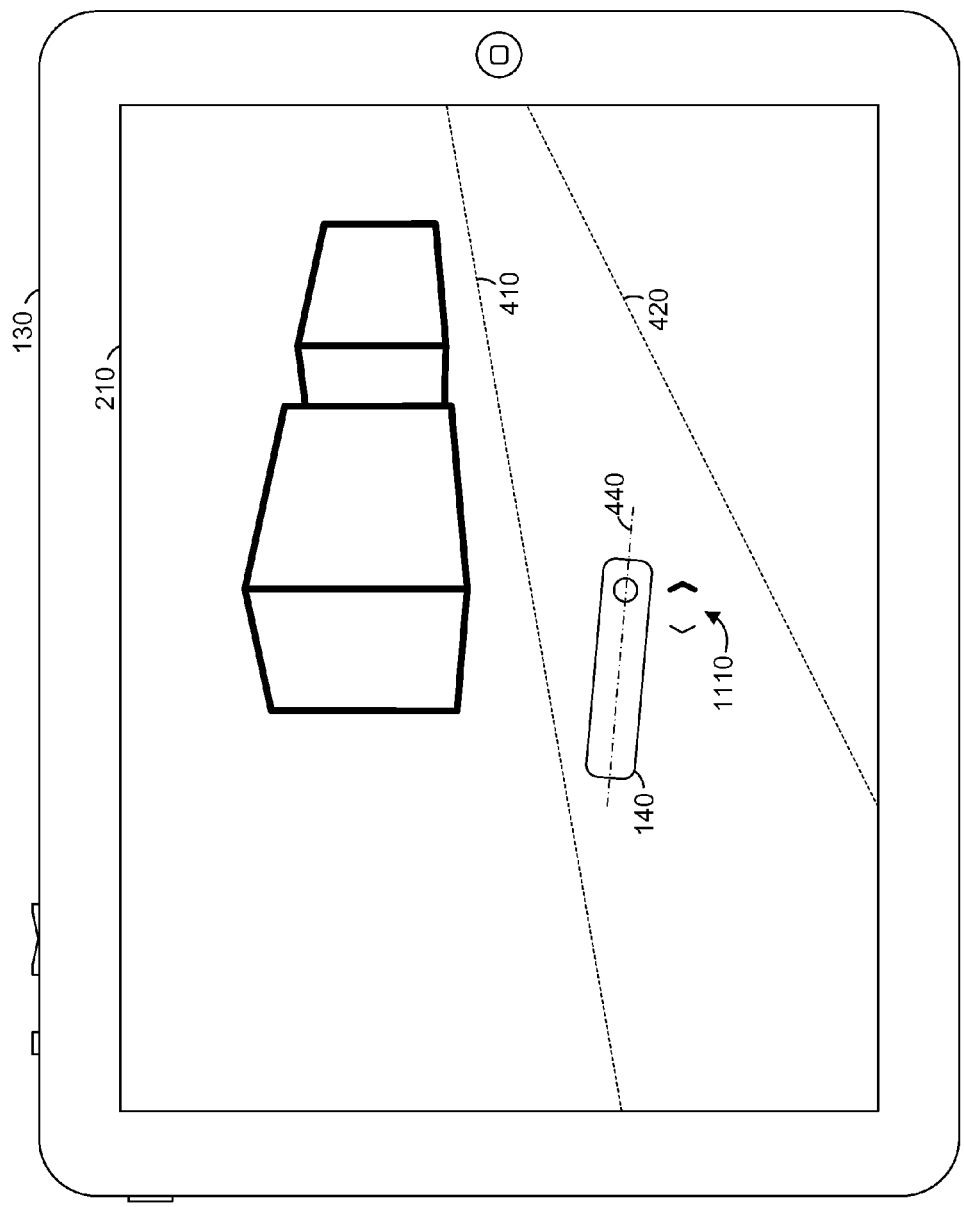
FIG. 12 is a top plan view of the touchscreen device, illustrating the hint lines pointing toward a right vanishing point within the perspective drawing, according to some example embodiments.

FIG. 12 is a top plan view of the touchscreen device 130, illustrating the hint lines 410 and 420 pointing toward a right vanishing point (e.g., offscreen as shown, or on the touchscreen 210) within a two-point perspective drawing (e.g., with the application 250 operating in "perspective mode"), according to some example embodiments. Though the perspective drawing shown in FIG. 12 utilizes two-point perspective, in alternative example embodiments may utilize single-point perspective. As noted above, the display of the hint lines 410 and 420 as pointing toward a right vanishing point may be based on the orientation of the guide device 140 (e.g., as indicated by its axis 440). As an example, the output module 240 may display one or more of the hint lines 410 and 420 as pointing toward a right vanishing point in response to the axis 440 being aligned within a predetermined threshold angle (e.g., 15 degrees) of an invisible line that intersects the right vanishing point.

As noted above, the toggle icon 1110 may be displayed on the touchscreen 210 to indicate which vanishing point has been selected and which vanishing point is available for selection. FIG. 12 shows the toggle icon 1110 with a thin left arrow and a thick right arrow to indicate that the right vanishing point has been selected (e.g., by the user 132 touching the right arrow) and that the left vanishing point is available for selection (e.g., by a touch on the left arrow).

Figure 13:
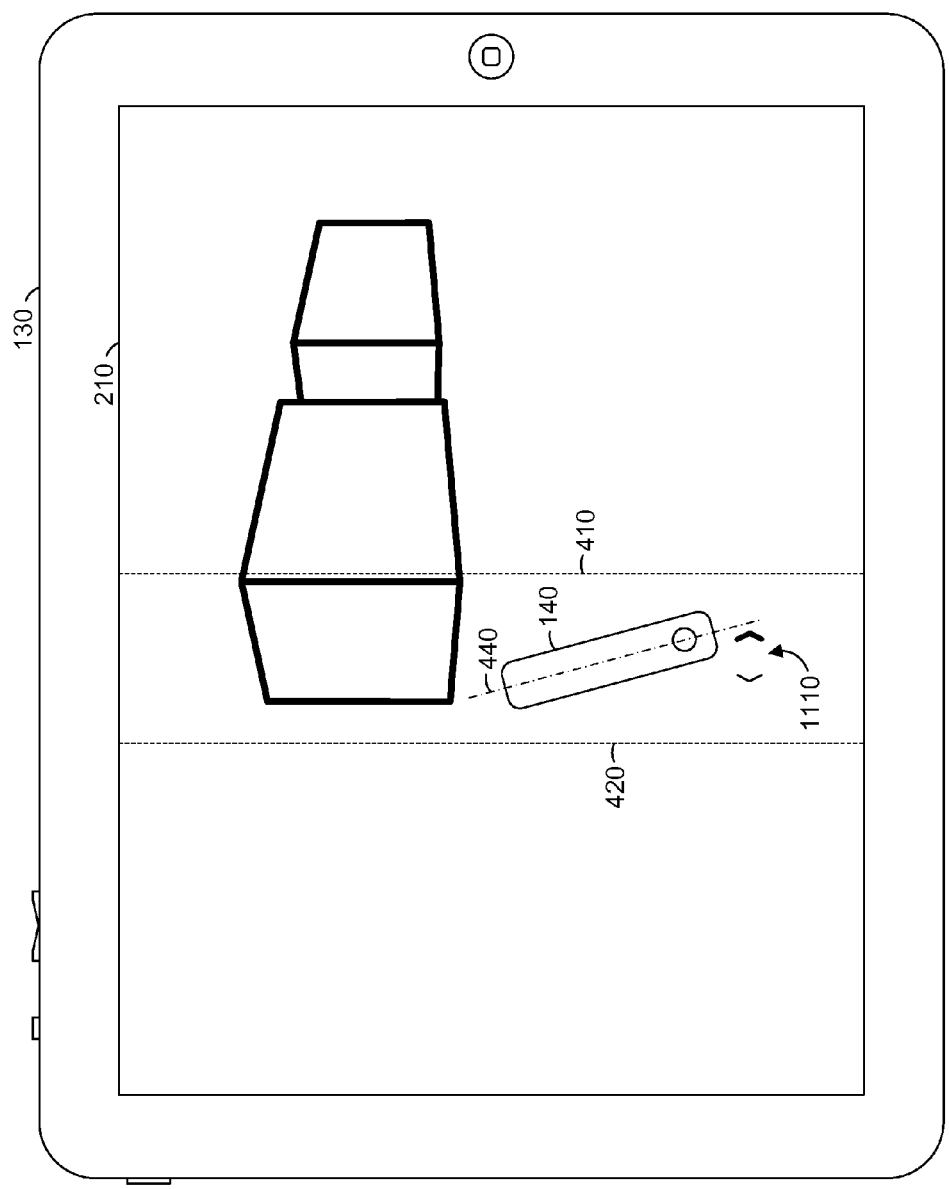
FIG. 13 is a top plan view of the touchscreen device, illustrating vertical hint lines within the perspective drawing, according to some example embodiments.

FIG. 13 is a top plan view of the touchscreen device 130, illustrating vertical hint lines (e.g., hint lines 410 and 420) within the perspective drawing (e.g., with the application 250 operating in "perspective mode"), according to some example embodiments. Although the perspective drawing illustrated in FIG. 13 utilizes two-point perspective, alternative example embodiments may utilize single-point perspective. The display of the hint lines 410 and 420 as being vertical within the perspective drawing may be based on the location of the guide device 140 (e.g., as indicated by its axis 440). For example, the output module 240 may display one or more of the hint lines 410 and 420 vertically in response to the axis 440 being aligned within a predetermined threshold angle (e.g., 18 degrees) of an invisible vertical line within the perspective drawing.

Figure 14:
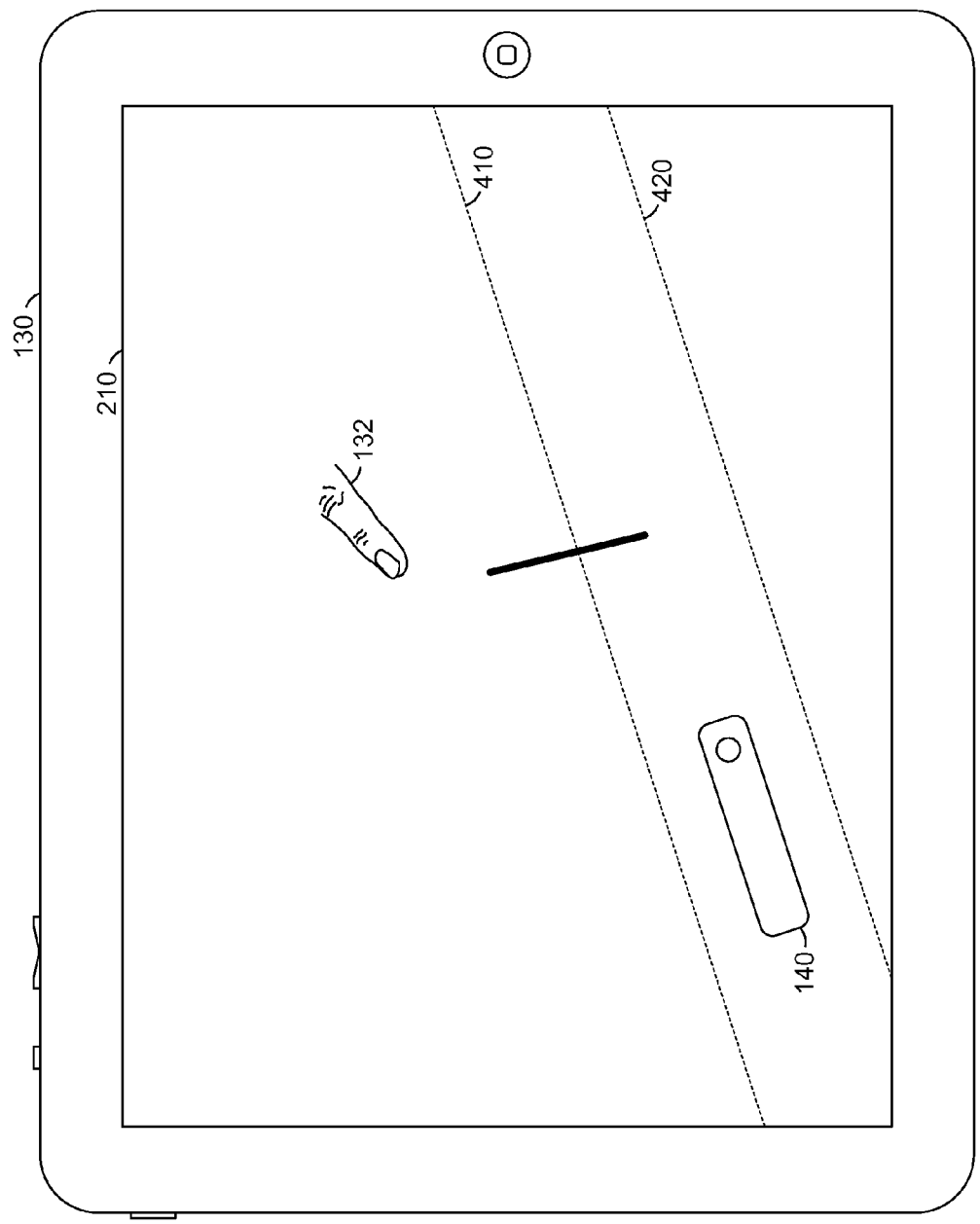
FIG. 14 is a top plan view of the touchscreen device, illustrating displayed contents prior to modification, according to some example embodiments.

FIG. 14 is a top plan view of the touchscreen device 130, illustrating displayed contents (e.g., a previously drawn line segment) prior to modification (e.g., by an image modification tool, such as a brush tool or eraser tool within a drawing application), according to some example embodiments. As shown, the guide device 140 is positioned such that the hint line 410 intersects a previously drawn line segment. Accordingly, one portion of the line segment lies on one side of the hint line 410 and another portion of the line segment lies on the other side of the hint line 410. According to certain example embodiments, the hint line 410 may be used as a drawing shield (e.g., a mask or barrier) to preclude one or more drawn objects, portions of drawn objects, background, or any suitable combination thereof, from being modified by one or more image modification tools (e.g., a brush tool or an eraser tool). FIG. 14 depicts a body part of the user 132 (e.g., a fingertip) performing a touch on the touchscreen 210 on one side of the hint line 410. If an image modification tool (e.g., a brush or eraser) is selected within the application 250 (e.g., a drawing application), the selected image modification tool will only be effective on the same side of the hint line 410 as the touch. This is described in greater detail below with respect to FIGS. 15 and 16.

Figure 15:
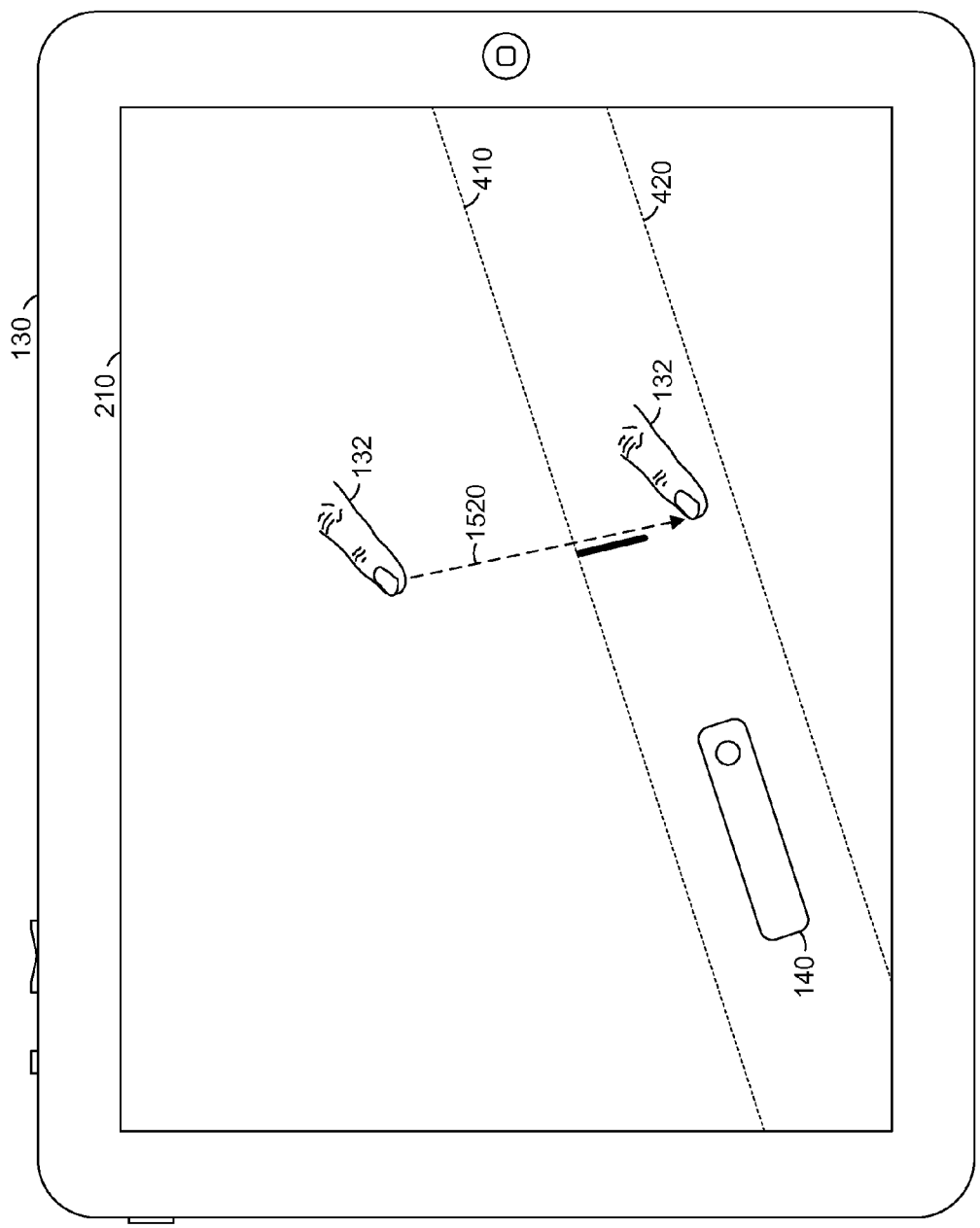
FIGS. 15 and 16 are top plan views of the touchscreen device, illustrating displayed contents being modified according to drag inputs, according to some example embodiments.
Figure 16:
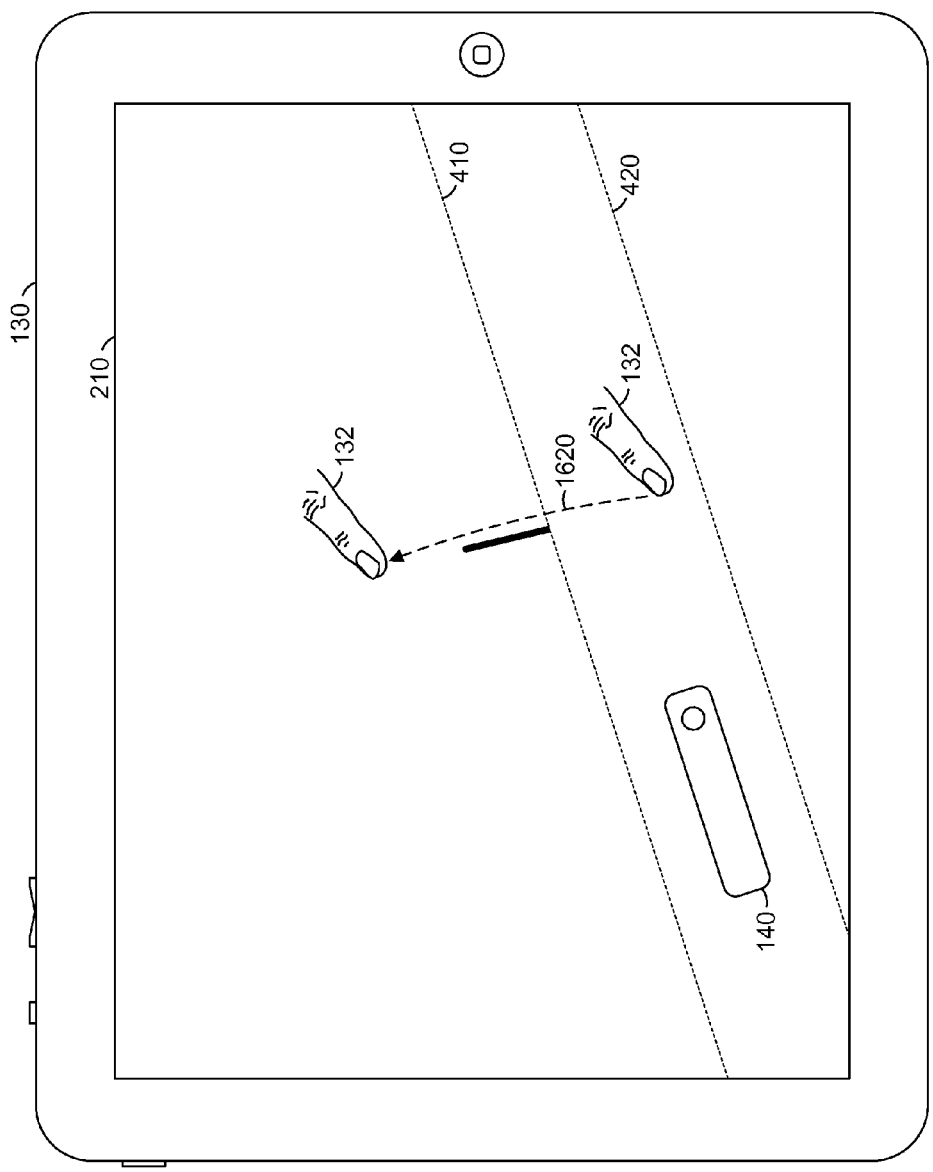

FIGS. 15 and 16 are top plan views of the touchscreen device 130, illustrating displayed contents (e.g., a previously drawn line segment) being modified according to different drag inputs 1520 and 1620, according to some example embodiments. As shown in FIG. 15, the body part of the user 132 (e.g., the fingertip) generates the drag input 1520 by touching the touchscreen 210 at the start of the path shown and sliding along the path from one side of the hint line 410 to the other side of the hint line 410. In the example embodiments shown in FIG. 15, an eraser tool has been selected as the image modification tool, and the eraser tool is only effective on the same side of the hint line 410 (e.g., the upper side of the hint line 410) as the start location of the drag input 1520. This erases an upper portion of the line segment previously discussed above with respect to FIG. 14. Once the drag input 1520 crosses the hint line 410, however, the eraser tool is no longer effective, and a lower portion of the line segment is preserved on the touchscreen 210, unchanged from its depiction in FIG. 14. In this manner, the hint line 410 may provide a visual effect similar to an erasing shield that allows drawn objects and portions thereof on one side of an edge of the erasing shield to be erased, while preventing erasure of drawn objects and portions thereof on the other side of the edge.

As shown in FIG. 16, the body part of the user 132 (e.g., the fingertip) generates the drag input 1620 by making a touch at the start of the path shown and sliding along the path from one side of the hint line 410 to the other side of the hint line 410. In the example embodiments illustrated in FIG. 16, an eraser tool has been selected as the image modification tool, and the eraser tool is only effective on the same side of the hint line 410 (e.g., the lower side of the hint line 410) as the start location of the drag input 1620. This erases a lower portion of the line segment previously discussed above with respect to FIG. 14. Once the drag input 1620 crosses the hint line 410, however, the eraser tool is no longer effective, and an upper portion of the line segment is preserved on the touchscreen 210, unchanged from its depiction in FIG. 14. As noted above, the hint line 410 may thus provide a visual effect similar to an erasing shield.

Figure 17:
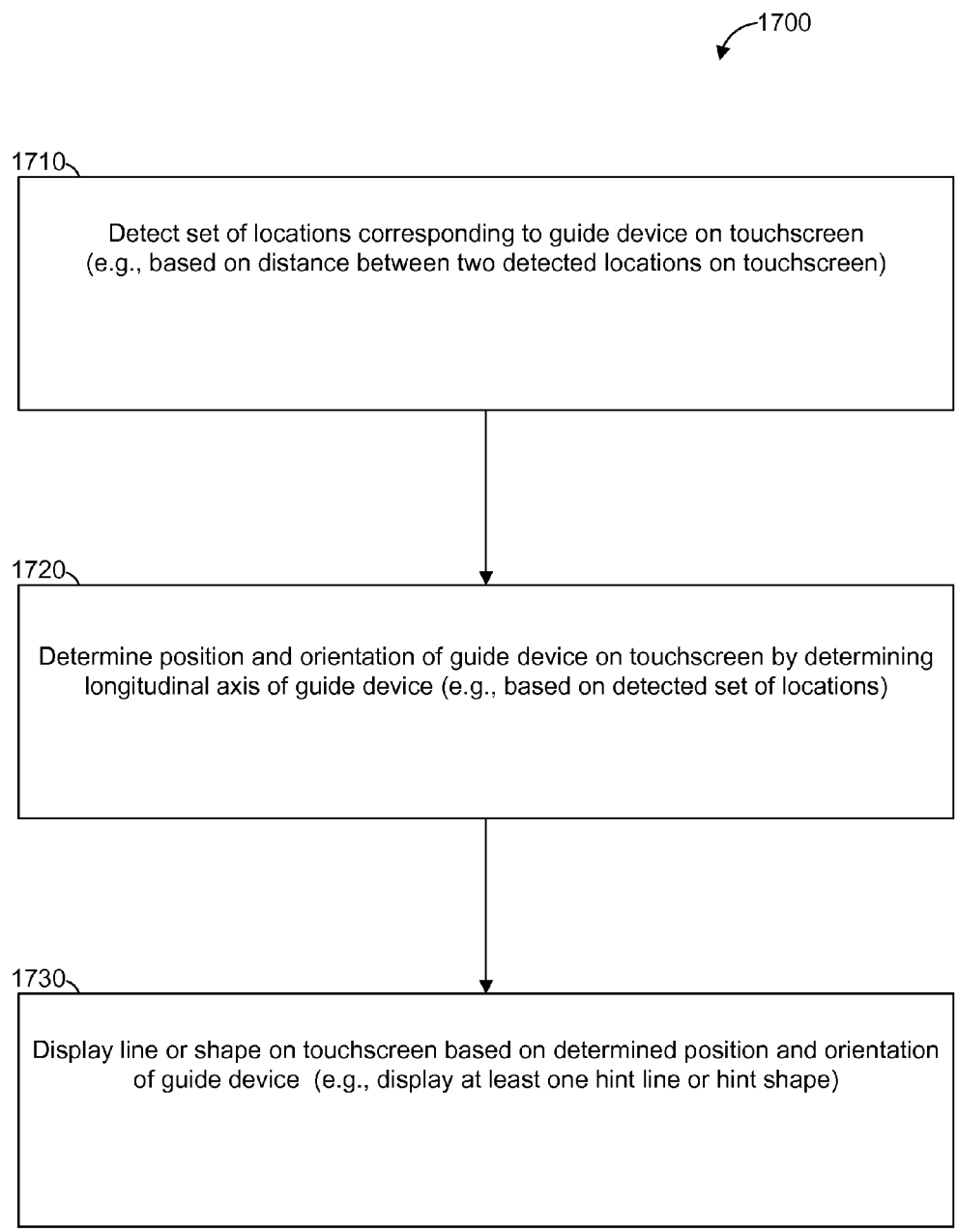
FIGS. 17-22 are flowcharts illustrating operations of the touchscreen device in performing a method of drawing on a touchscreen, according to some example embodiments.

FIGS. 17-22 are flowcharts illustrating operations of the touchscreen device 130 in performing a method 1700 of drawing on the touchscreen 210, according to some example embodiments. Operations in the method 1700 may be performed by the touchscreen device 130, using modules described above with respect to FIG. 2. As shown in FIG. 17, the method 1700 includes operations 1710, 1720, and 1730.

In operation 1710, the touch module 220 detects a set of one or more locations at which the guide device 140, and contact with the touchscreen 210, triggered a set of one or more contact signals on the touchscreen 210. The guide device 140 may be configured to trigger to contact signals (e.g., a pair of contact signals) on the touchscreen 210. For example, the guide device 140 may include one or more components each configured to mimic a tip of the stylus or a fingertip of a person (e.g., user 132) and accordingly cause a corresponding contact signal that indicates a touch on the touchscreen 210.

In some example embodiments, the guide device 140 is configured to trigger a characteristic arrangement (e.g., characteristic pattern) of contact signals on the touchscreen 210. For example, the guide device 140 may be configured to trigger a pair of contact signals separated by a predetermined reference distance that is characteristic of the guide device 140. As another example, the guide device 140 may be configured to trigger a trio of contact signals separated by predetermined references distances and angles that are characteristic of the guide device 140. Such contact signals may be detected by the touch module 220, resulting in the touch module 220 detecting their corresponding locations on the touchscreen 210.

In operation 1720, the analysis module 230 determines the position of the guide device 140 on the touchscreen 210 and an orientation of the guide device 140 on the touchscreen 210. This determination may be made by determining the axis 440 of the guide device 140 based on the set of locations detected in operation 1710.

In example embodiments in which the guide device 140 triggers a pair of contact signals separated by predetermined reference distance that is characteristic of the guide device 140, the analysis module 230 may track the corresponding pair of locations on the touchscreen 210 over a brief period of time (e.g., 250 milliseconds). Specifically, the analysis module 230 may calculate and monitor the distance between the two locations. If the two locations move closer together or farther apart in the first fraction of a second after their corresponding contact signals appear, the analysis module 230 may treat these contact signals as being unrelated to the guide device 140 (e.g., as being instead indicative of a pinch gesture or other two-finger gesture).

On the other hand, if the detected distance spanning the two locations remains fixed, the analysis module 230 may compare the detected distance to a reference distance (e.g., stored by the analysis module 230) that is characteristic of the guide device 140. If the detected distance matches (e.g., within a tolerance value) the reference distance, the analysis module 230 may treat these contact signals as being indicative of the position and orientation of the guide device 140 on the touchscreen 210. In this situation, the analysis module 230 may determine the axis 440 (e.g., longitudinal axis) of the guide device 140 by calculating a line (e.g., visible or invisible) that intersects the pair of locations at which the guide device 140 triggered the pair of contact signals.

In operation 1730, the output module 240 displays one or more lines (e.g., hint line 410) or one or more shapes (e.g., shape 710) based on the position and orientation of the guide device 140 (e.g., as determined in operation 1720). As noted above, the guide device 140, the application 250, or both, may offer the user 132 a variety of lines, shapes, or both, as drawing guides. For example, the user 132 may select from a set (e.g., "palette") of lines, shapes, or both, by activating a control (e.g., a button) on the guide device 140, by configuring the application 250 (e.g., by operating a palette control setting or by saving a user preference), by activating a control on the stylus 150, or any suitable combination thereof. In some example embodiments, the set of lines, shapes, or both, may be presented one at a time (e.g., cyclically scrolled) with each activation of a suitable control. Accordingly, operation 1730 may display a previously selected line or shape (e.g., according to a previously made selection by the user 132).

In various example embodiments, as noted above with respect to FIGS. 4-6, the output module 240 may display one or more of the hint lines 410 or 420 parallel to the axis 440 (e.g., as determined in operation 1720). Furthermore, the hint line 420 may be displayed on the opposite side of the axis 440 (e.g., on the opposite side of the guide device 140) from the hint line 410.

Figure 18:
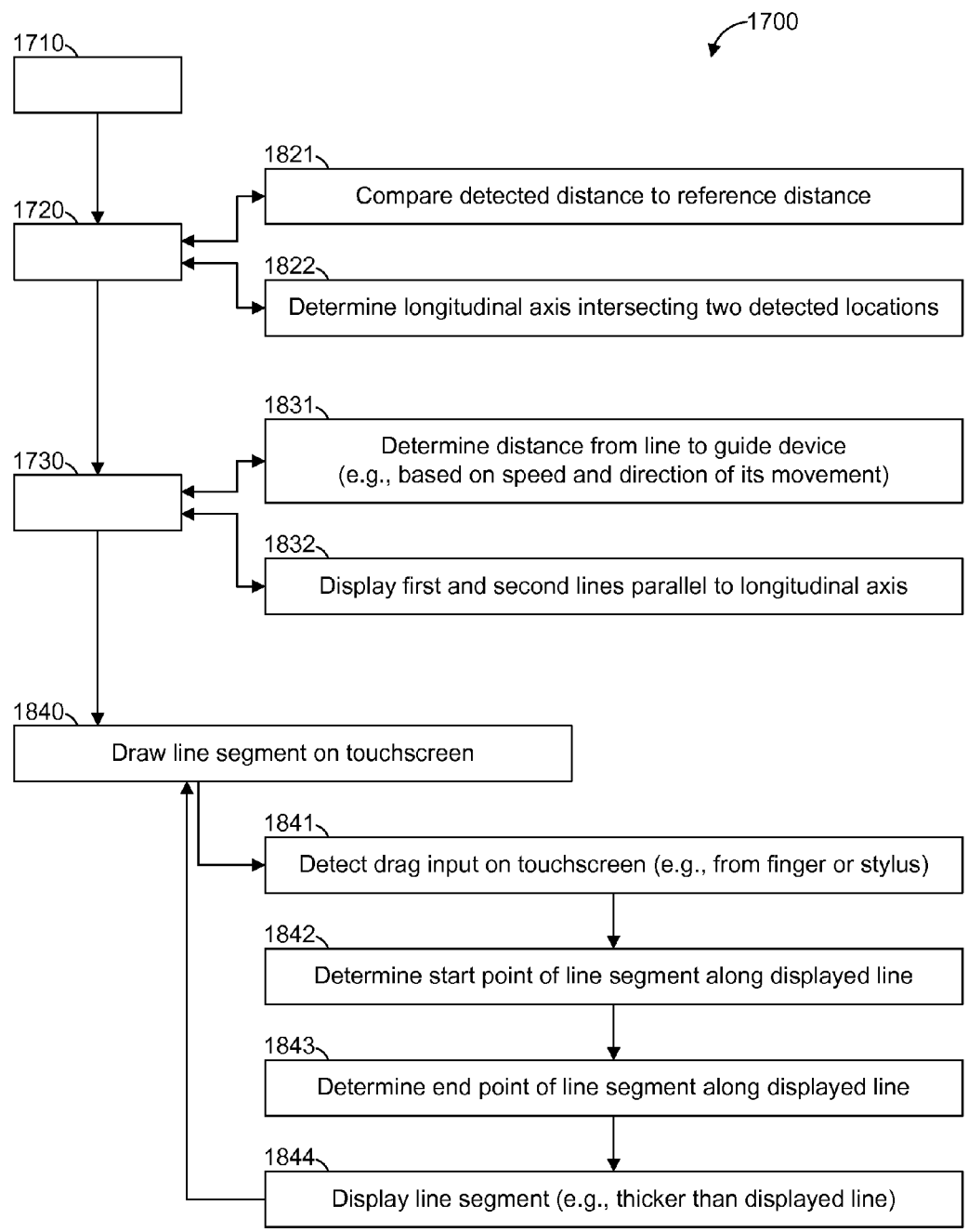

As shown in FIG. 18, the method 1700 may include one or more of operations 1821, 1822, 1831, 1832, and 1840. Operations 1821 and 1822 may be performed as part (e.g., a precursor task, a subroutine, or a portion) of operation 1720, in which the analysis module 230 determines the position and orientation of the guide device 140. In operation 1821, the analysis module 230 performs the comparing of the detected distance (e.g., spanning the detected pair of locations) to the reference distance that is characteristic of the guide device 140. As noted above, if the detected distance matches the reference distance (e.g., within an applicable tolerance value), the analysis module 230 may determine that the guide device 140 is in contact with the touchscreen 210 and proceed to determine (e.g., calculate) the axis 440 in operation 1822.

In certain example embodiments, the analysis module 230 applies one or more tolerance values in determining whether the detected distance between the two locations matches the reference distance that is characteristic of the guide device 140. For example, a stricter tolerance value (e.g., within three pixels) is applied initially (e.g., during the first 500 milliseconds), and a looser tolerance value (e.g., within nine pixels) is applied afterwards. Using a strict tolerance value initially may help prevent false or accidental detection of the guide device 140, and using a loose tolerance value afterward may help account for inaccuracies (e.g., drift effects or Doppler effects) in detecting contact signals on the touchscreen 210 as the guide device 140 is moved around the touchscreen 210.

In operation 1822, the analysis module 230 determines the axis 440 of the guide device 140. In some example embodiments, the analysis module 230 calculates the line (visible or not) that intersects a pair of locations at which the guide device 140 triggered a pair of contact signals (e.g., as detected in operation 1710).

One or more of operations 1831 in 1832 may be performed as part of operation 1730, in which the output module 240 may display one or both of the hint lines 410 and 420. In example embodiments in which the output module 240 displays a hint line (e.g., hint line 410), the output module 240 may perform operation 1831 by determining a distance from the hint line (e.g., hint line 410) to the guide device 140 or to its axis 440. As noted in FIG. 18 and described above with respect to FIG. 5, this distance may be determined based on a speed and direction of movement by the guide device 140, by the axis 440, or both. For example, the distance between the guide device 140 and the hint line (e.g., hint line 410) may be determined based on the perpendicular speed of the guide device 140 relative to the axis 440 (e.g., based on the perpendicular speed of the axis 440 relative to itself).

In some example embodiments, the guide device 140 is moving toward the hint line 410 (e.g., away from the hint line 420), and the distance between the guide device 140 and the hint line 410 may be reduced based on (e.g., in proportion to) the speed at which the guide device 140, the axis 440, or both, is moving perpendicularly toward the hint line 410. This may contribute to a visual effect in which the hint line 410 appears to have mass, inertia, momentum, or any suitable combination thereof, such that an initial sharp movement of the guide device 140 toward the hint line 410 does not immediately cause the hint line 410 to move.

In certain example embodiments, the guide device 140 is moving toward the hint line 420 (e.g., away from the hint line 410), and the distance between the guide device 140 and the hint line 420 is increased based on (e.g., in proportion to) the speed at which the guide device 140, the axis 440, or both, is moving perpendicularly toward the hint line 420. This may contribute to a visual effect in which the hint line 420 appears to move perpendicularly farther away from the guide device 140 as the speed of the guide device 140 increases.

Operation 1840 may be performed after operation 1730, in which the output module 240 may display the hint line 410 on the touchscreen 210. In operation 1840, the application 250 draws the line segment 611 on the touchscreen 210, based on the drag input 620. Operation 1840 may include one or more of operations 1841, 1842, 1843, and 1844.

In operation 1841, the touch module 220 detects the drag input 620 on the touchscreen 210. As noted above, the drag input 620 may be generated by the body part of the user 132 touching and dragging from one location to another on the touchscreen 210. The touch module 220 may detect the drag input 620 while the hint line 410 is displayed on the touchscreen 210.

In operation 1842, the output module 240 determines a start point of the line segment 611. For example, the output module 240 may determine that the hint line 410 is the nearest hint line to the drag input 620. Based on this determination, the output module 240 may use the hint line 410 as a guide for drawing the line segment 611. As noted above, the start point of the line segment 611 may be determined by orthogonally (e.g., perpendicularly) projecting an initial location of the drag input 620 onto the hint line 410, such that an invisible line perpendicular to the hint line 410 intersects the initial location of the drag input 620. From the determined start point, the line segment 611 may be drawn by the output module 240 based on the length and direction of the drag input 620.

In operation 1843, the output module 240 determines an end point of the line segment 611. As noted above, the end point of the line segment 611 may be determined by orthogonally (e.g., perpendicularly) projecting a final location of the drag input 620 onto the hint line 410, such that an invisible line perpendicular to the hint line 410 intersects the final location of the drag input 620.

In operation 1844, the output module 240 displays the line segment 611 as being drawn on the touchscreen 210. For example, the line segment 611 may be displayed thicker than the hint line 410, in a different color, or any suitable combination thereof.

Figure 19:
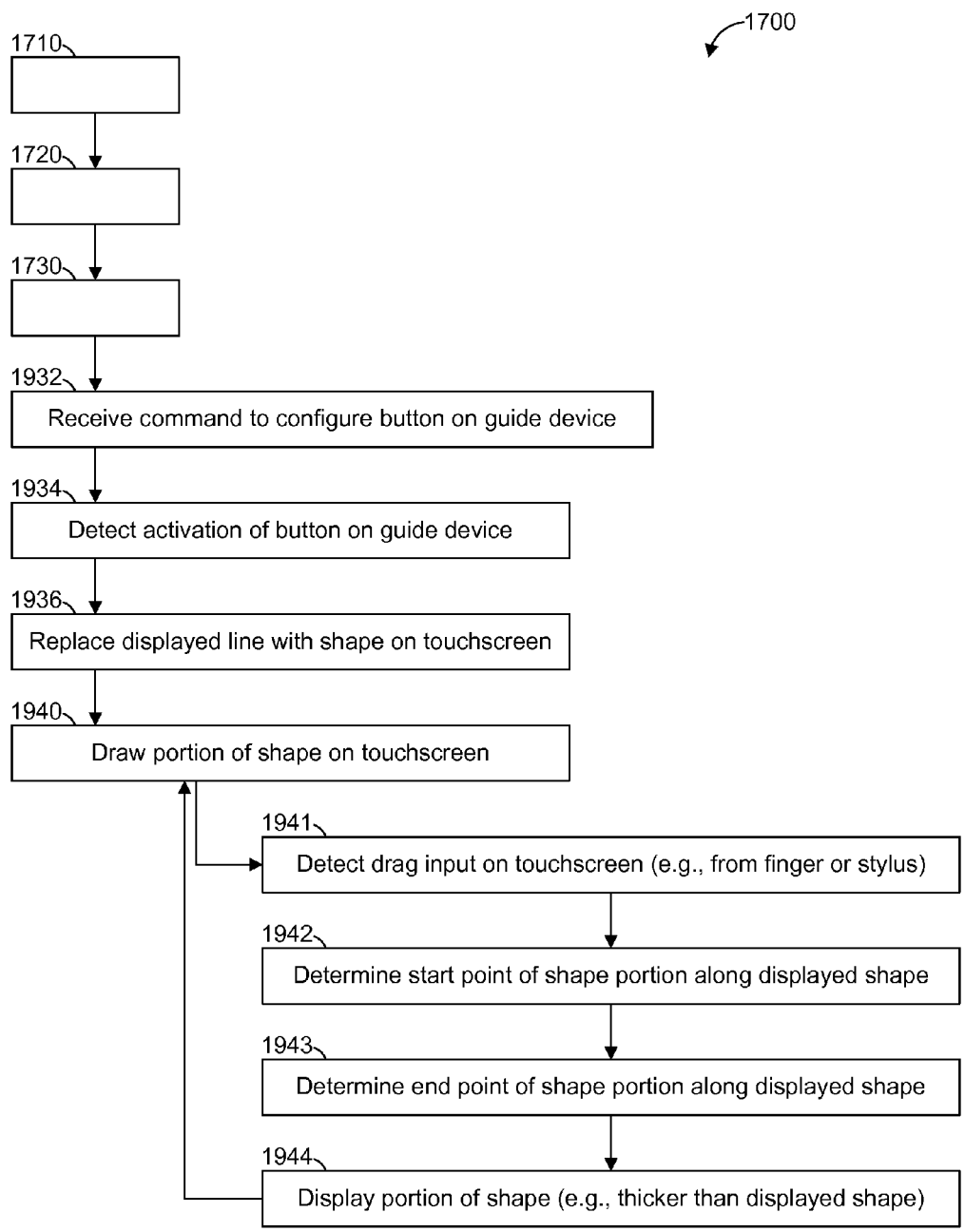

As shown in FIG. 19, the method 1700 may include one or more of operations 1932, 1934, 1936, and 1940. In operation 1932, the output module 240 receives a command to configure a control (e.g., a button) on the guide device 140, and the command may configure the control to cause display of a user-generated shape (e.g., downloaded from the server machine 110, or stored on the touchscreen device 130).

In operation 1934, the touch module 220 detects activation of the control (e.g., the button) on the guide device 140 (e.g., by detecting an additional location at which the guide device 140 triggered an additional contact signal on the touchscreen 210). In some example embodiments, the detected activation of the control is a press of a button on the guide device 140 for less than a predetermined threshold duration (e.g., less than 800 milliseconds).

In operation 1936, in response to the activation of the control (e.g., detected in operation 1934), the output module 240 replaces any displayed hint lines (e.g., hint lines 410 and 420) or displayed shapes (e.g., shape 710, which may be a circle) with a replacement shape (e.g., shape 810, such as a square). This may have the effect of allowing the user 132 to scroll through a sequence of hint lines and hint shapes (e.g., including one or more user-generated shapes, as configured in response to operation 1932).

Operation 1940 may be performed anytime a shape (e.g., shape 710, shape 810, or a user-generated shape) is being displayed on the touchscreen 210. In operation 1940, the application 250 draws a portion of the displayed shape (e.g., portion 711 or portion 811). Operation 1940 may include one or more of operations 1941, 1942, 1943, and 1944.

In operation 1941, the touch module 220 detects the drag input 820 on the touchscreen 210. As noted above, the drag input 820 may be generated by the body part of the user 132 touching and dragging from one location to another on the touchscreen 210. The touch module 220 may detect the drag input 820 while the shape 810 is displayed on the touchscreen 210.

In operation 1942, the output module 240 determines a start point of the portion 811 of the shape 810. For example, the output module 240 may use the shape 810 as a guide for drawing the portion 811. As noted above, the start point of the portion 811 may be determined by radially projecting an initial location of the drag input 820 toward the center of the shape 810 (e.g., the center of the square), such that an invisible line from the center to the initial location intersects the shape 810 at the start point of the portion 811. From the determined start point, the portion 811 may be drawn by the output module 240 based on the length and direction of the drag input 620.

In operation 1943, the output module 240 determines an end point of the portion 811 of the shape 810. As noted above, the end point of the portion 811 may be determined by radially projecting a final location of the drag input 820 toward the center of the shape 810, such that an invisible line from the center to the final location intersects the shape 810 at the end point of the portion 811.

In operation 1944, the output module 240 displays the portion 811 of the shape 810 as being drawn on the touchscreen 210. For example, the portion 811 may be displayed thicker than the remainder of the shape 810, in a different color, or any suitable combination thereof.

Figure 20:
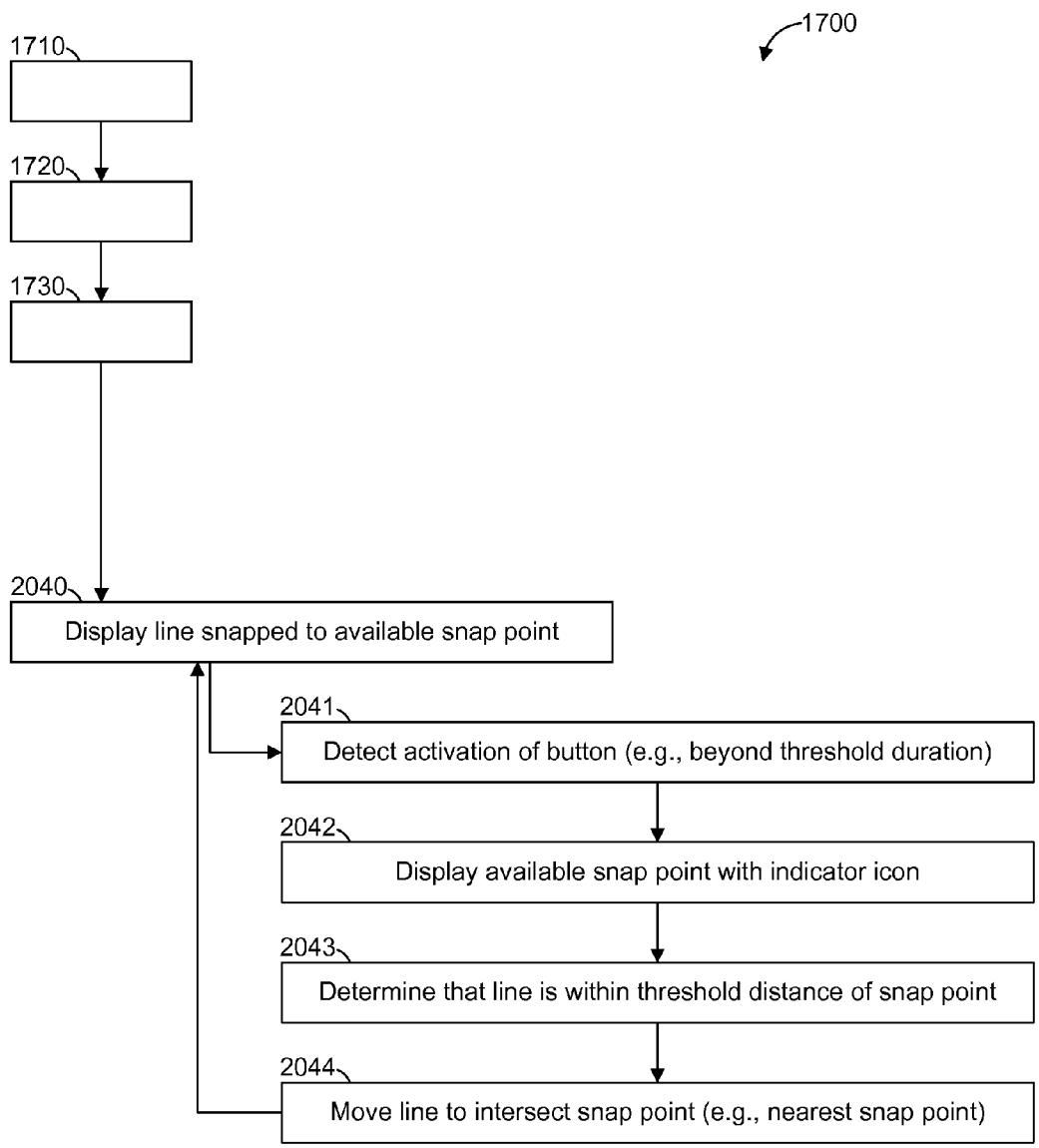

As shown in FIG. 20, the method 1700 may include operation 2040, in which the application 250 displays the hint line 410 as having been moved (e.g., snapped) to an available snap point. Operations 2041, 2042, 2043, and 2044 may be performed as part of operation 2040.

In operation 2041, the touch module 220 detects activation of the control (e.g., the button) on the guide device 140 (e.g., by detecting an additional location at which the guide device 140 triggered an additional contact signal on the touchscreen 210). In some example embodiments, the detected activation of the control is a press of a button on the guide device 140 for greater than a predetermined threshold duration (e.g., longer than 800 milliseconds).

In operation 2042, the output module 240 displays an available snap point on a drawn object. For example, as illustrated in FIG. 9, the output module 240 may display the icon 911 at the lower end of the portion 711 (e.g., a previously drawn portion of a circle). This appearance of the icon 911 may indicate that the lower end of the portion 711 is an available snap point within a first predetermined threshold distance (e.g., 200 pixels) of the hint line 410. In some example embodiments, the available snap point is displayed (e.g., indicated by the icon 911) while the activation of the control persists (e.g., while the button continues to be held down).

In operation 2043, the output module 240 determines that the hint line 410 is (e.g., has been moved) within a second predetermined threshold distance (e.g., 50 pixels) of the available snap point on the drawn object (e.g., indicated in operation 2042 with the icon 911). Continuing the above example, the available snap point may be the lower end of the portion 711, as illustrated FIG. 9. For example, the output module 240 may determine that the minimum distance (e.g., orthogonal distance) between the hint line 410 and the available snap point is less than a second predetermined threshold distance. In some example embodiments, this determination is performed while the activation of the control persists.

In operation 2044, the output module 240 moves the hint line 410 to intersect the displayed snap point (e.g., indicated by the icon 911). Continuing the preceding example, the hint line 410 may be moved to intersect the lower end of the portion 711. This may provide the visual effect of snapping the hint line 410 to the snap point (e.g., the nearest available snap point to the hint line 410). As noted above, such a situation is illustrated in FIG. 10. In some example embodiments, the moving of the hint line 410 is in response to the hint line 410 being within the second predetermined threshold distance (e.g., 50 pixels) of the available snap point, during activation of the control (e.g., while the button is pressed) on the guide device 140.

Figure 21:
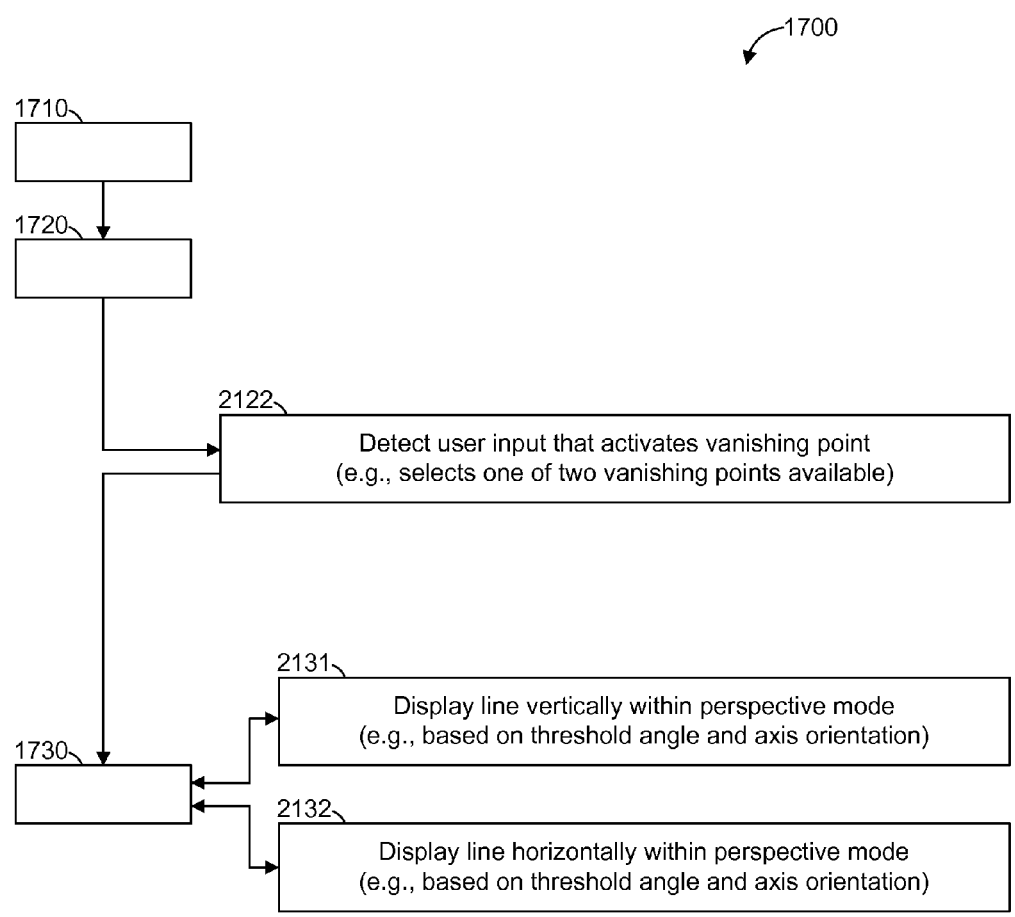

As shown in FIG. 21, the method 700 may include operation 2122. In operation 2122, the touch module 220 detects user input (e.g., a touch), that activates a vanishing point (e.g., a left vanishing point or a right vanishing point) within a two-dimensional perspective view (e.g., perspective mode) that depicts a three-dimensional space (e.g., scene). For example, the touch module 220 may detect a touch (e.g., by a fingertip of the user 132 or by the stylus 150) on the left arrow in the toggle icon 1110. The detected user input may select one of two vanishing points available within the two-dimensional perspective view, thus resulting in selection of a first vanishing point (e.g., a left vanishing point) instead of a second vanishing point (e.g., a right vanishing point) of the two-dimensional perspective view.

In some example embodiments, operation 2131 is performed as part of operation 1730, in which the output module 240 may display one or both of the hint lines 410 and 420. In operation 2131, the output module 240 displays one or both of the hint lines 410 and 420 vertically within the two-dimensional perspective view. This may be based on the orientation of the guide device 140 (e.g., as indicated by the orientation of its axis 440) and on a predetermined threshold angle (e.g., 15 degrees away from vertical). For example, the output module 240 may compare the orientation of the guide device 140 to the predetermined threshold angle and display the hint lines 410 and 420 vertically in response to the orientation of the axis 440 being within the predetermined threshold angle of a vertical direction in the two-dimensional perspective view.

In certain example embodiments, operation 2132 is performed as part of operation 1730. In operation 2132 the output module 240 displays one or both of the hint lines 410 and 420 horizontally within the two-dimensional perspective view. As illustrated in FIG. 11 and FIG. 12, one or both of the hint lines 410 and 420 may be displayed pointing exclusively toward a left vanishing point or exclusively toward a right vanishing point, depending on how the user 132 operates the toggle icon 1110. Furthermore, operation 2132 may be performed based on the orientation of the guide device 140 (e.g., as indicated by the orientation of its axis 440) and on a predetermined threshold angle (e.g., 20 degrees away from horizontal within the perspective view, or 20 degrees away from an invisible line that intersects the selected vanishing point). For example, the output module 240 may compare the orientation of the guide device 140 to the predetermined threshold angle and display the hint lines 410 and 420 as shown in FIG. 11 in response to the orientation of the axis 440 being within the predetermined threshold angle of an invisible line that intersects the left vanishing point.

Figure 22:
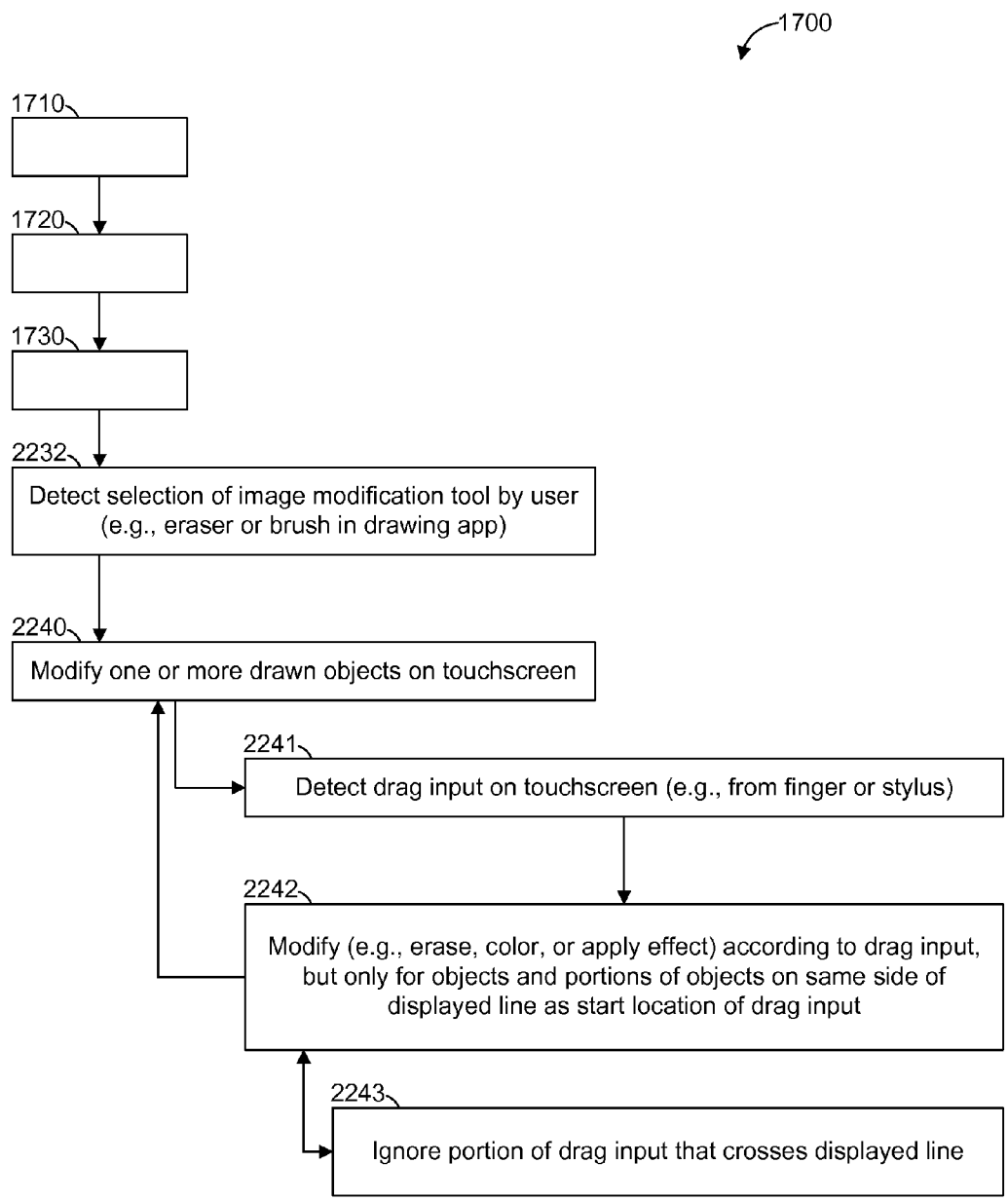

As shown in FIG. 22, the method 1700 may include one or more of operations 2232 and 2240. In operation 2232, the output module 240 detects selection of an image modification tool (e.g., a brush tool or eraser tool within the application 250) by the user 132. In operation 2240, the application 250 modifies displayed contents (e.g., one or more previously drawn objects or portions thereof) on the touchscreen 210, based on the selected image modification tool.

Operations 2241 and 2242 may be performed as part of operation 2040. In operation 2241, the touch module 220 detects a drag input (e.g., drag input 1520 or drag input 1620). As discussed above with respect to FIG. 15 and FIG. 16, the drag input may start from a first location on a first side of the hint line 410 and end at a second location on the opposite side of the hint line 410. The drag input may be produced by a finger tip of the user 132 or the stylus 150.

In operation 2242, the output module 240 modifies the displayed contents on the touchscreen 210 in accordance with the selected image modification tool (e.g., the brush or the eraser) and in accordance with the drag input (e.g., drag input 1520 or drag input 1620), but only on the first side of the hint line 410. That is, the selected image modification tool is effective only on the same side of the hint line 410 as the first location, where the drag input started. As discussed above with respect to FIG. 15, if an eraser tool has been selected as the image modification tool, the eraser tool is only effective on the same side of the hint line 410 (e.g., the upper side of the hint line 410) as the start location of the drag input 1520.

Operation 2243 may be performed as part of operation 2242. In operation 2243, the output module 240 ignores any portion of the drag input (e.g., drag input 1520 or drag input 1620) that crosses the hint line 410. As discussed above with respect to FIG. 15, if an eraser tool has been selected as the image modification tool, once the drag input 1520 crosses the hint line 410, the eraser tool is no longer effective, and a lower portion of the line segment is preserved on the touchscreen 210. Accordingly, the hint line 410 may function as an erasing shield that allows drawn objects and portions thereof on one side of an edge of the erasing shield to be erased, while preventing erasure of drawn objects and portions thereof on the other side of the edge.

According to various example embodiments, one or more of the methodologies described herein may facilitate greater convenience, precision, accuracy, and pleasure in drawing on a touchscreen. As a result, one or more of the methodologies described herein may obviate a need for certain efforts or resources that otherwise would be involved in providing such convenience, precision, accuracy, and pleasure in drawing on a touchscreen. Efforts expended by the user 132 in producing drawings as desired may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 23:
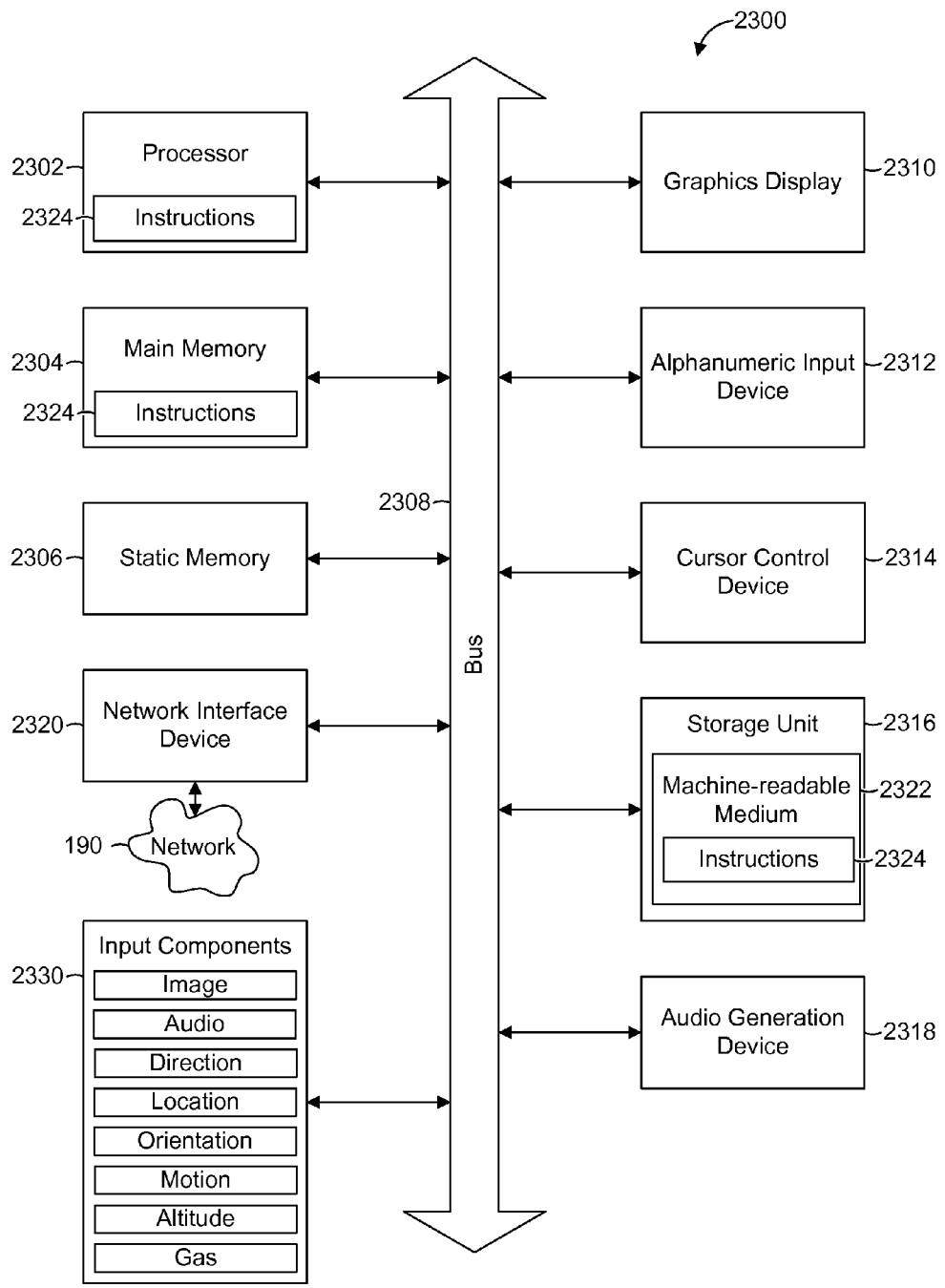
FIG. 23 is a block diagram illustrating components of a machine, according to some example embodiments, able to read instructions from a machine-readable medium and perform any one or more of the methodologies discussed herein.

FIG. 23 is a block diagram illustrating components of a machine 2300, according to some example embodiments, able to read instructions 2324 from a machine-readable medium 2322 (e.g., a machine-readable storage medium, a computer-readable storage medium, or any suitable combination thereof) and perform any one or more of the methodologies discussed herein, in whole or in part. Specifically, FIG. 23 shows the machine 2300 in the example form of a computer system within which the instructions 2324 (e.g., software, a program, an application, an applet, an app, or other executable code) for causing the machine 2300 to perform any one or more of the methodologies discussed herein may be executed, in whole or in part. In alternative embodiments, the machine 2300 operates as a standalone device or may be connected (e.g., networked) to other machines. In a networked deployment, the machine 2300 may operate in the capacity of a server machine or a client machine in a server-client network environment, or as a peer machine in a distributed (e.g., peer-to-peer) network environment. The machine 2300 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 2324, sequentially or otherwise, that specify actions to be taken by that machine. Further, while only a single machine is illustrated, the term "machine" shall also be taken to include any collection of machines that individually or jointly execute the instructions 2324 to perform all or part of any one or more of the methodologies discussed herein.

The machine 2300 includes a processor 2302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2304, and a static memory 2306, which are configured to communicate with each other via a bus 2308. The processor 2302 may contain microcircuits that are configurable, temporarily or permanently, by some or all of the instructions 2324 such that the processor 2302 is configurable to perform any one or more of the methodologies described herein, in whole or in part. For example, a set of one or more microcircuits of the processor 2302 may be configurable to execute one or more modules (e.g., software modules) described herein.

The machine 2300 may further include a graphics display 2310 (e.g., a plasma display panel (PDP), a light emitting diode (LED) display, a liquid crystal display (LCD), a projector, a cathode ray tube (CRT), or any other display capable of displaying graphics or video). The machine 2300 may also include an alphanumeric input device 2312 (e.g., a keyboard or keypad), a cursor control device 2314 (e.g., a mouse, a touchpad, a trackball, a joystick, a motion sensor, an eye tracking device, or other pointing instrument), a storage unit 2316, an audio generation device 2318 (e.g., a sound card, an amplifier, a speaker, a headphone jack, or any suitable combination thereof), and a network interface device 2320.

The storage unit 2316 includes the machine-readable medium 2322 (e.g., a tangible and non-transitory machine-readable storage medium) on which are stored the instructions 2324 embodying any one or more of the methodologies or functions described herein. The instructions 2324 may also reside, completely or at least partially, within the main memory 2304, within the processor 2302 (e.g., within the processor's cache memory), or both, before or during execution thereof by the machine 2300. Accordingly, the main memory 2304 and the processor 2302 may be considered machine-readable media (e.g., tangible and non-transitory machine-readable media). The instructions 2324 may be transmitted or received over the network 190 via the network interface device 2320. For example, the network interface device 2320 may communicate the instructions 2324 using any one or more transfer protocols (e.g., hypertext transfer protocol (HTTP)).

In some example embodiments, the machine 2300 may be a portable computing device, such as a smart phone or tablet computer, and have one or more additional input components 2330 (e.g., sensors or gauges). Examples of such input components 2330 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2322 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 2324 for execution by the machine 2300, such that the instructions 2324, when executed by one or more processors of the machine 2300 (e.g., processor 2302), cause the machine 2300 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
detecting a set of locations at which a guide device is in contact with a touchscreen based on a distance of at least two contact signals on the touchscreen matching a reference distance predetermined by a characteristic of the guide device;
using a processor, determining a position of the guide device on the touchscreen and an orientation of the guide device on the touchscreen by determining a longitudinal axis of the guide device based on the detected set of locations on the touchscreen; and
displaying a line on the touchscreen parallel to the longitudinal axis determined based on the determined position and orientation of the guide device on the touchscreen.

2. The method of claim 1, further comprising:
determining the distance of the at least two contact signals on the touchscreen remaining within a predetermined tolerance value of the reference distance in a predetermined time period.

3. The method of claim 2, wherein the predetermined tolerance value is a first predetermined tolerance value, and the predetermined time period is a first predetermined time period, the method further comprising:
determining the distance of the at least two contact signals on the touchscreen remaining within a second predetermined tolerance value of the reference distance in a second predetermined time period, wherein the second predetermined tolerance value is greater than the first predetermined tolerance value, and the second predetermined time period is after the first predetermined time period.

4. The method of claim 1, wherein:
the displaying of the line comprises displaying a first line parallel to the longitudinal axis;
and the method further comprises displaying a second line parallel to the longitudinal axis and opposite the first line on the touchscreen.

5. The method of claim 1, wherein:
the displaying of the line on the touchscreen is at a distance apart from the guide device on the touchscreen; and the method further comprises determining the distance from the line to the guide device based on a speed of the guide device perpendicular to the longitudinal axis.

6. The method of claim 1 further comprising:
detecting a drag input that starts from a first further location on the touchscreen and ends at a second further location on the touchscreen;
determining a start point of a line segment along the displayed line based on the first further location on the touchscreen;
determining an end point of the line segment along the displayed line based on the second further location on the touchscreen; and
displaying the line segment on the touchscreen thicker than the displayed line on the touchscreen.

7. The method of claim 1 further comprising:
detecting activation of a button on the guide device; and
replacing the displayed line with a shape displayed on the touchscreen in response to the detected activation of the button.

8. The method of claim 7 further comprising:
detecting a drag input that starts from a first further location on the touchscreen and ends at a second further location on the touchscreen;
determining a start point of a portion of the displayed shape based on the first further location on the touchscreen;
determining an end point of the portion of the displayed shape based on the second further location on a touchscreen; and
displaying the portion of the shape on the touchscreen thicker than a remainder of the displayed shape on the touchscreen.

9. The method of claim 7, wherein:
the shape is a user-generated shape; and the method further comprises receiving a command to configure the button to cause display of the user-generated shape.

10. The method of claim 1 further comprising:
determining that the displayed line is within a threshold distance of a point on an object displayed on the touchscreen during activation of a button on the guide device; and the method further comprises moving the displayed line to intersect the point in response to the displayed line being within the threshold distance of the point during the activation of the button.

11. The method of claim 10, wherein:
the activation of the button is a press of the button beyond a predetermined threshold duration; and the method further comprises displaying the point on the object with an icon that indicates the point is within the threshold distance.

12. The method of claim 1 further comprising:
detecting a user input that activates a vanishing point of a two-dimensional perspective view that depicts a three-dimensional space; and wherein
the displayed line is depicted as vertical within the three-dimensional space in response to the detected user input and based on the longitudinal axis.

13. The method of claim 1 further comprising:
detecting a user input that activates a vanishing point of a two-dimensional perspective view that depicts a three-dimensional space; and wherein the displayed line points toward the vanishing point in response to the detected user input and based on the longitudinal axis.

14. The method of claim 13, wherein:
the user input that activates the vanishing point selects a first vanishing point instead of a second vanishing point of the two-dimensional perspective view; and
the displayed line points toward the selected first vanishing point and not toward the second vanishing point.

15. The method of claim 1 further comprising:
detecting a drag input that starts from a first further location on a first side of the displayed line and ends at a second further location on an opposite side of the displayed line; and
modifying contents displayed on the touchscreen in accordance with the drag input but only from the first further location to the displayed line and not from the displayed line to the second further location.

16. The method of claim 15, wherein:
the drag input corresponds to an eraser tool within a drawing application; and the modifying of the contents includes omitting a first object drawn between the first further location and the displayed line without omitting a second object drawn between the displayed line and the second further location.

17. A non-transitory machine-readable storage medium comprising instructions that, when executed by one or more processors of a machine with a touchscreen, cause the machine to:
  detect a set of locations at which a guide device is in contact with a touchscreen based on a distance of at least two contact signals on the touchscreen matching a reference distance predetermined by a characteristic of the guide device;
  determine a position of the guide device on the touchscreen and an orientation of the guide device on the touchscreen by determining a longitudinal axis of the guide device based on the detected set of locations on the touchscreen; and
  display a line on the touchscreen parallel to the longitudinal axis determined based on the determined position and orientation of the guide device on the touchscreen.

18. The non-transitory machine-readable storage medium of claim 17, the instructions further cause the machine to:
  detect a drag input that starts from a first further location on the touchscreen and ends at a second further location on the touchscreen;
  determine a start point of a line segment along the displayed line based on the first further location on the touchscreen;
  determine an end point of the line segment along the displayed line based on the second further location on the touchscreen; and
  display the line segment on the touchscreen thicker than the displayed line on the touchscreen.

19. A system comprising:
  a touchscreen;
  a touch module configured to detect a set of locations at which a guide device is in contact with a touchscreen;
  an analysis module configured to determine a distance between at least two locations of the set of locations matching a reference distance predetermined by a characteristic of the guide device, and to determine a position of the guide device on the touchscreen and an orientation of the guide device on the touchscreen based on a longitudinal axis of the guide device determined based on the set of locations; and
  an output module configured to display a line on the touchscreen parallel to the longitudinal axis.

20. The system of claim 19, wherein:
  the analysis module is further to determine the distance between the at least two locations remaining within a predetermined tolerance value of the reference distance in a predetermined time period.

\* \* \* \* \*